US012114327B2

(12) United States Patent
Sun et al.

(10) Patent No.: US 12,114,327 B2
(45) Date of Patent: Oct. 8, 2024

(54) APPARATUS AND METHOD FOR SEMI-PERSISTENT SCHEDULING AND POWER CONTROL IN WIRELESS COMMUNICATION SYSTEM

(71) Applicant: Samsung Electronics Co., Ltd., Suwon-si (KR)

(72) Inventors: Feifei Sun, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/872,815

(22) Filed: Jul. 25, 2022

(65) Prior Publication Data

US 2022/0361157 A1  Nov. 10, 2022

Related U.S. Application Data

(63) Continuation of application No. 15/933,886, filed on Mar. 23, 2018, now Pat. No. 11,399,364.

(30) Foreign Application Priority Data

Mar. 24, 2017  (CN) .......................... 201710186528.6
Apr. 26, 2017  (CN) .......................... 201710282233.9
(Continued)

(51) Int. Cl.
*H04W 72/23* (2023.01)
*H04L 1/1829* (2023.01)
(Continued)

(52) U.S. Cl.
CPC ........... *H04W 72/23* (2023.01); *H04L 1/1864* (2013.01); *H04L 1/1896* (2013.01);
(Continued)

(58) Field of Classification Search
CPC ... H04W 72/23; H04W 72/04; H04W 72/042; H04W 72/0406; H04W 72/0413;
(Continued)

(56) References Cited

U.S. PATENT DOCUMENTS 8,942,151 B2  1/2015  Anderson et al.
9,544,876 B2  1/2017  Chen et al.
(Continued)

FOREIGN PATENT DOCUMENTS

EP        2 922 357 A1      9/2015
WO    2013/169173 A1    11/2013
(Continued)

OTHER PUBLICATIONS

Huawei, Hisilicon, Clarification on 2 HARQ process applicability to UE-specific search space, 3GPP TSG-RAN WG1 Meeting #91, Nov. 27-Dec. 1, 2017, Reno, USA, R1-1721317.
(Continued)

*Primary Examiner* — Sudesh M Patidar
(74) *Attorney, Agent, or Firm* — Jefferson IP Law, LLP

(57) ABSTRACT

A method performed by a user equipment (UE) is provided. The method includes receiving, from a base station, configuration information on a random access configuration for a narrowband including: information on an initial power of a random access preamble for an enhanced coverage level, and information associated with a power ramping for the enhanced coverage level, and performing a first random access preamble transmission corresponding to a first transmit power, wherein the first transmit power is set based on the information on the initial power of the random access preamble and the information associated with the power ramping in case that the UE is in the enhanced coverage level, and wherein the UE is a narrow band internet of things (NB-IoT) UE.

12 Claims, 23 Drawing Sheets

(30) Foreign Application Priority Data

Jun. 12, 2017 (CN) .......................... 201710439018.5
Jan. 10, 2018 (CN) .......................... 201810024387.2

(51) Int. Cl.
| | |
|---|---|
| H04L 1/1867 | (2023.01) |
| H04L 5/00 | (2006.01) |
| H04W 52/02 | (2009.01) |
| H04W 72/04 | (2023.01) |

(52) U.S. Cl.
CPC ........... *H04L 5/0053* (2013.01); *H04W 52/02* (2013.01); *H04W 72/04* (2013.01); *H04L 5/0055* (2013.01); *Y02D 30/70* (2020.08)

(58) Field of Classification Search
CPC ............. H04W 36/0005; H04W 52/34; H04W 52/0053; H04W 52/02; H04L 1/1864; H04L 1/1861; H04L 1/1896; H04L 5/0053; H04L 5/0055; H04L 5/0046; H04L 5/001; Y02D 30/70

See application file for complete search history.

(56) References Cited

U.S. PATENT DOCUMENTS

| | | | |
|---|---|---|---|
| 2010/0151874 A1 | 6/2010 | Cai et al. | |
| 2011/0182245 A1 | 7/2011 | Malkamaki et al. | |
| 2011/0239072 A1 | 9/2011 | Cai et al. | |
| 2012/0307758 A1 | 12/2012 | Moon et al. | |
| 2013/0163536 A1 | 6/2013 | Anderson et al. | |
| 2014/0241319 A1 | 8/2014 | Lee et al. | |
| 2015/0117337 A1 | 4/2015 | Choi et al. | |
| 2016/0204906 A1 | 7/2016 | Cheng et al. | |
| 2016/0234787 A1* | 8/2016 | Liu .................. | H04W 52/28 |
| 2016/0242206 A1 | 8/2016 | Ohlsson et al. | |
| 2016/0254899 A1 | 9/2016 | Hwang et al. | |
| 2016/0278075 A1 | 9/2016 | Yang et al. | |
| 2016/0295609 A1* | 10/2016 | Vajapeyam ............... | H04L 5/14 |
| 2016/0337988 A1* | 11/2016 | Nan .................. | H04W 74/0833 |
| 2016/0337991 A1* | 11/2016 | Zhang .................. | H04L 1/08 |
| 2016/0353440 A1* | 12/2016 | Lee .................. | H04W 74/0833 |
| 2016/0353478 A1 | 12/2016 | Kim et al. | |
| 2017/0230979 A1 | 8/2017 | Saxena et al. | |
| 2017/0290030 A1 | 10/2017 | Wang et al. | |
| 2018/0092122 A1 | 3/2018 | Babaei et al. | |
| 2018/0123744 A1 | 5/2018 | Nogami et al. | |
| 2018/0124753 A1 | 5/2018 | Sun et al. | |
| 2018/0139735 A1 | 5/2018 | Akkarakaran et al. | |
| 2018/0139774 A1 | 5/2018 | Ma et al. | |
| 2018/0145794 A1 | 5/2018 | Zhang et al. | |
| 2018/0176945 A1 | 6/2018 | Cao et al. | |
| 2018/0183551 A1 | 6/2018 | Chou et al. | |
| 2018/0199359 A1 | 7/2018 | Cao et al. | |
| 2018/0206271 A1* | 7/2018 | Chatterjee ............. | H04W 72/21 |
| 2018/0270880 A1 | 9/2018 | Hosseini et al. | |
| 2018/0279327 A1 | 9/2018 | Ying et al. | |
| 2018/0317180 A1* | 11/2018 | Li ........................ | H04W 52/242 |
| 2018/0376508 A1* | 12/2018 | Höglund .................. | H04W 4/70 |
| 2019/0014564 A1 | 1/2019 | Lee et al. | |
| 2019/0021085 A1 | 1/2019 | Mochizuki et al. | |
| 2019/0029033 A1 | 1/2019 | Tang et al. | |
| 2020/0067690 A1 | 2/2020 | Park et al. | |
| 2021/0282191 A1* | 9/2021 | Chang .................. | H04W 16/18 |

FOREIGN PATENT DOCUMENTS

| | | | |
|---|---|---|---|
| WO | 2014007938 A1 | 1/2014 | |
| WO | WO-2015056924 A1 * | 4/2015 | ............... H04L 1/00 |

OTHER PUBLICATIONS

Huawei, Hisilicon, Correction to random access power control in 36.306, 3GPP TSG-RAN2 Meeting #100, Nov. 27-Dec. 1, 2017, Reno, USA, R2-1714254.

Huawei, Hisilicon, Correction to random access power control in 36.321, 3GPP TSG-RAN2 Meeting #100, Nov. 27-Dec. 1, 2017, Reno, USA, R2-1714255.

Huawei, Hisilicon, Correction to random access power control in 36.331, 3GPP TSG-RAN2 Meeting #100, Nov. 27-Dec. 1, 2017, Reno, USA, R2-1714256.

"Remaining issues for SC-PTM" (D1), 3GPP TSG RAN WG1 Meeting #88, R1-1701863, Athens, Greece, Feb. 13-17, 2017.

"Discussion on DCI format of V2X.." (D2), 3GPP TSG RAN WG1 Meeting #88, R1-1701620, Athens, Greece Feb. 13-17, 2017.

"SC-PTM support of SPS" (D3), 3GPP TSG RAN WG1 Meeting #88, R1-1701858, Athens, Greece, Feb. 13-17, 2017.

Extended European Search Report dated Mar. 11, 2020, issued in European Search Reported Application No. 18770861.5.

European Office Action dated Apr. 1, 2021, issued in European Patent Application No. 18770861.5.

Extended European Search Report dated Aug. 22, 2023, issued in European Patent Application No. 23171401.5.

Korean Notice of Patent Grant dated Oct. 27, 2023, issued in Korean Patent Application No. 10-2019-7031564.

CMCC, Discussion on SPS configurations, R1-164878, 3GPP TSG RAN WG1 Meeting #85, Nanjing, China, May 13, 2016.

Korean Office Action dated Apr. 3, 2023, issued in Korean Patent Application No. 10-2019-7031564.

\* cited by examiner

APPARATUS AND METHOD FOR SEMI-PERSISTENT SCHEDULING AND POWER CONTROL IN WIRELESS COMMUNICATION SYSTEM

CROSS-REFERENCE TO RELATED APPLICATION(S)

This application is a continuation application of prior application Ser. No. 15/933,886, filed on Mar. 23, 2018, which issued as U.S. Pat. No. 11,399,364 on Jul. 26, 2022, and which is based on and claims priority under 35 U.S.C. § 119(a) of a Chinese patent application number 201710186528.6, filed on Mar. 24, 2017, in the Chinese Patent Office, of a Chinese Patent Application No. 201710282233.9, filed on Apr. 26, 2017, in the Chinese Intellectual Property Office, of a Chinese Patent Application No. 201710439018.5, filed on Jun. 12, 2017, in the Chinese Intellectual Property Office, and of a Chinese Patent Application No. 201810024387.2, filed on Jan. 10, 2018, in the Chinese Intellectual Property Office, the disclosure of each of which is incorporated by reference herein in its entirety.

TECHNICAL FIELD

The disclosure relates to a technical field of a wireless communication system. More particularly, the disclosure relates to an apparatus and a method for semi-persistent scheduling and power control in the wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In 5G system, various applications are considered. In some application scenarios of the 5G, a fast access process is required. For example, for a fast cell handover, the handover latency requirement is much smaller than the handover latency requirement in LTE.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for semi-persistent scheduling, a method for power control and corresponding user equipments thereof, with high communication efficiency and being adapted to high frequency retransmission application scene in narrow band internet of things (NB-IoT).

In accordance with an aspect of the disclosure, a method for semi-persistent scheduling (SPS) is provided. The method includes the following operations: monitoring downlink control information (DCI) in a first format group, and activating SPS according to an indication in the DCI in the first format group, and monitoring DCI in a second format group, and releasing SPS according to an indication in the DCI in the second format group, wherein a payload size of the DCI format in the second format group is less than the payload size of the DCI format in the first format group.

Preferably, after the operations of monitoring a DCI of a first format group, and activating SPS according to an indication in the DCI in the first format group, the method further comprises determining a transmission format transmitted on resource assigned by SPS according to the DCI in the first format group, and/or receiving or transmitting data on resource assigned by SPS according to the determined transmission format.

Preferably, the operation of determining the transmission format transmitted on resource assigned by SPS comprises: determining a transmission format transmitted on resources assigned by SPS according to a new data indicator (NDI) field of the DCI in the first format group, and/or receiving or transmitting the data on resources assigned by SPS according to the determined transmission format, if the determined transmission format is an initial transmission of the data, receiving or transmitting the initial transmission of the data on resources assigned by SPS, and if the determined transmission format is a retransmission of the data, receiving or transmitting the retransmission of the data on resources assigned by SPS.

Preferably, after the operations of monitoring a DCI of a first format group, and activating SPS according to the indication in the DCI in the first format group, the method further comprises: determining the process number of hybrid automatic repeat request (HARQ) and the transmission format transmitted on the resource assigned by SPS, according to the DCI in the first format group, and processing received or transmitted data on resources assigned by SPS according to the determined HARQ process number and the transmission format.

Preferably, each type of DCI format in the first format group or the second format group comprises one or more of the following fields: data channel repetition number field, NDI field, HARQ-ACK resource field to indicate the resource to transmit HARQ ACK/NACK, scheduling time-delay field (comprising starting position of time domain resource and/or occupied time duration), resource assigning field (comprising occupied frequency domain resource location), modulation and coding scheme field, subcarrier indication field and redundant version number field.

Preferably, the operation of activating SPS according to the indication in the DCI in the first format group, comprises: deciding whether specific field(s) in the DCI is pre-defined configuration(s), if specified field(s) is/are the pre-configured, activating the SPS, wherein, this DCI successfully go through the cyclic redundancy check (CRC) scrambled by SPS cell radio network temporary identifier (SPS C-RNTI), the specified field comprises one or a multiple of the following fields: scheduling time-delay field, redundant version number field, HARQ-ACK resource field to indicate the resource to transmit HARQ ACK/NACK, HARQ process number field, the repetition number field of the data channel scheduled by SPS and DCI subframe repetition number field.

Preferably, after the operation of releasing SPS according to the indication in the DCI in the second format group, the method further comprises: transmitting acknowledgement (ACK) information for SPS release on resource for ACK/NACK transmission.

Preferably, the resource for ACK/NACK transmission is indicated by the DCI in the second format group, or configured by high layer radio resource control (RRC) signaling, or is a pre-determined value.

Preferably, the operation of receiving or transmitting the data on resources assigned by SPS, comprises at least one of the following methods: if the determined transmission format is an initial transmission of the data, transmitting the initial transmission of the data on resources assigned by SPS, until receiving a corresponding NACK information, transmitting a retransmission of the data on resources assigned by SPS; if the determined transmission format is a retransmission of the data, transmitting the retransmission of the data on resources assigned by SPS, or, until receiving a corresponding ACK information, stopping the retransmission of the data on resources assigned by SPS; if the determined transmission format is an initial transmission of the data, receiving and decoding the initial transmission of the data on resources assigned by SPS; or, until the decoding for the received initial transmission the data is failed and transmitting a corresponding NACK information, receiving a retransmission of the data on the resources assigned by SPS, if the determined transmission format is a retransmission of the data, receiving and decoding the retransmission of the data on resource assigned by SPS; until the decoding the received retransmission of the data successfully and transmitting a corresponding ACK information, stopping the retransmission of the data on the resources assigned by SPS; or if the determined transmission format is a retransmission of the data, receiving and decoding the retransmission of the data on resource assigned by SPS, if the decoding for the received retransmission of the data is failed, transmitting or not transmitting the corresponding NACK information, and continue to receive retransmission of the data on resource assigned by SPS.

In accordance with another aspect of the disclosure, a method for transmitting an HARQ-ACK feedback of a downlink SPS (DL SPS) is provided. The method includes the following operations: acquiring, by a user equipment (UE), a slot format indication (SFI) in a DCI and dynamically adjusting slot(s) and/or symbol(s) for uplink or downlink or flexible slots and/or symbols according to the SFI, deciding whether the resource used for a transmission of HARQ-ACK feedback information of at least one-time physical downlink shared channel (PDSCH) transmission scheduled by the DL SPS is rewritten as the resource for a downlink transmission or flexible resource, and if the resource is rewritten as the resource for the downlink transmission or as flexible resource, postponing the transmission of HARQ-ACK feedback information to the next available resource location for an uplink transmission, or canceling the transmission of HARQ-ACK feedback information.

Preferably, if the resource used for transmission of HARQ-ACK feedback information of at least one-time PDSCH transmission scheduled by the DL SPS is rewrote as the resource for downlink transmission or as flexible resource, the UE doesn't decode the PDSCH corresponding to the HARQ-ACK. That is, the base station cancels the PDSCH transmission corresponding to the HARQ-ACK.

Preferably, the HARQ-ACK feedback information of at least one PDSCH transmission scheduled by the DL SPS is transmitted with other UCI information on the physical uplink control channel (PUCCH) or physical uplink shared channel (PUSCH) simultaneously.

Preferably, the above other UCI information is one or more of the following information: HARQ-ACK feedback information, scheduling request (SR) and channel state information (CSI).

Preferably, deciding whether the resource used for the transmission of HARQ-ACK feedback information of at least one time PDSCH transmission scheduled by the DL SPS is rewrote as the resource for the downlink transmission or flexible resource, and if the resource location is rewrote as the resource for downlink transmission or as flexible resource by the SFI, and the HARQ-ACK feedback information of at least one time PDSCH transmission scheduled by the DL SPS is transmitted on the PUCCH alone, the transmission of the HARQ-ACK feedback information is canceled.

Preferably, deciding whether the resource used for at least one-time PDSCH transmission scheduled by the DL SPS is rewrote as the resource for the downlink transmission or as flexible resource by the SFI, and if the resource location is rewrote as the resource for downlink transmission or as flexible resource by the SFI, the transmission of the HARQ-ACK feedback information of at least one-time PDSCH transmission scheduled by the DL SPS is canceled.

Preferably, deciding whether the resource used for at least one time PDSCH transmission scheduled by the DL SPS is rewrote as the resource for the downlink transmission or as flexible resource by the SFI, and if the resource location is rewrote as the resource for downlink transmission or as flexible resource by the SFI and if the HARQ-ACK feedback information of at least one time PDSCH transmission scheduled by the DL SPS is transmitted on the PUCCH alone, the transmission of the HARQ-ACK feedback information is canceled, or if the HARQ-ACK feedback information of the at least one PDSCH transmission scheduled by the DL SPS is transmitted with other UCI information on the PUCCH and PUSCH simultaneously, the feedback information corresponding to the HARQ-ACK is set as NACK, or the feedback information corresponding to HARQ-ACK is not transmitted.

In accordance with another aspect of the disclosure, a user equipment for semi-persistent scheduling is provided. The user equipment includes: an activating module configured to monitor a DCI in a first format group and activate SPS according to an indication in the DCI in the first format group, a releasing module, monitor DCI in a second format group, and release SPS according to an indication in the DCI in the second format group, wherein, the payload size of the DCI format in the second format group is less than the payload size of the DCI format in the first format group.

Compared with conventional art, the effect of the disclosure comprises: the payload size of the scheduled DCI format after SPS is activated in the disclosure is less than the payload size of the scheduled DCI format activated by the SPS, to reduce the power consumption of UE for monitoring and detecting DCI, schedule overhead of downlink channel of SPS, and the service delay, and promote efficiency of resource utilization significantly.

In accordance with another aspect of the disclosure, a method for SPS is provided. The method includes the following operations: acquiring resources assigned by SPS; detecting a wake-up signal; and if the wake-up signal is detected successfully, decoding physical downlink shared channel (PDSCH) or transmitting PUSCH on the acquired resources assigned by SPS.

Preferably, the wake-up signal comprises at least one of UE identifier, identifier of UE group and identifier of system message change.

Preferably, transmission forms of the wake-up signal comprise as least one of the following: a type of sequence, a type of waveform, a type of DCI format, a type of specific field in DCI format, and/or a type of scramble code for scrambling physical downlink control channel (PDCCH).

Preferably, the operation of detecting a wake-up signal, comprises detecting wake-up signal on the PDCCH.

Preferably, the operation of if the wake-up signal is detected successfully, decoding PDSCH or transmitting PUSCH on the acquired resources assigned by SPS comprises: if the wake-up signal is detected successfully, deciding whether or not PDCCH needs to be detected according the wake-up signal, if the result of deciding is that the PDCCH needs to be detected, reading the PDCCH after the wake-up signal, and decoding the PDSCH or transmitting PUSCH on the time-frequency resource indicated by PDCCH.

In accordance with another aspect of the disclosure, a user equipment is provided. the user equipment includes: acquiring resource module, configured to acquiring resource assigned by SPS; and detecting wake-up signal module, configured to detecting a wake-up signal; decoding channel module, configured to decode PDSCH or transmit physical uplink shared channel (PUSCH), if the wake-up signal is detected successfully, on acquired resource assigned by SPS.

Compared with conventional art, the technical effect of the disclosure comprises: a DCI with a small payload that is designed as a wake-up signal, in combination with SPS resource assignment, and the UE can decide whether or not to decode PDSCH or transmit PUSCH after directly monitoring the wake-up signal. if the SPS resource assignment of PDSCH or PUSCH is needed to be rewritten dynamically, whether or not need to monitor extra PDCCH can be indicated by the wake-up signal, so as to reduce the decoding time of UE, reduce the power consumption of UE and make the UE more power-saving, effectively.

In accordance with another aspect of the disclosure, a method for power control is provided. The method includes the following operations: acquiring by a UE an enhanced coverage level which the UE belongs to, according to the type of the enhanced coverage level, and determining a transmit power corresponding to the type of the enhanced coverage level.

Preferably, according to the type of the enhanced coverage level, the determined transmit power corresponding to the type of the enhanced coverage level is the maximum transmit power. If the UE belongs to the first enhanced coverage level, setting the maximum transmit power as a first power value, and if UE belongs to the second enhanced coverage level, setting the maximum transmit power as a second power value.

Preferably, one or two of the first power value and the second power value is/are obtained by the base station configuration.

Preferably, the second power value is a maximum transmit power of the equipment itself.

Preferably, repetition number of narrowband physical random-access channel (NPRACH) corresponding to the second enhanced coverage level is larger than that of NPRACH corresponding to the first enhanced coverage level.

Preferably, after UE ramped up to the second enhanced coverage level, setting the first power value, or the transmit power used for transmitting NPRACH at the first enhanced coverage level for the last time, or a transmit power calculated according to received target power of the second enhanced coverage level, as initial transmit power of NPRACH, and if a random access request is determined to have failed, performing power ramping according to a power ramping operation configured by a base station, until reaching the second power value or the maximum NPRACH attempt number.

Preferably, UE acquires whether UE needs to perform power ramp at the second enhanced level by system information.

Preferably, after the maximum transmit power is set, according to resource scheduling of Msg3 and the set maximum transmit power, set a transmit power of Msg3, and transmitting Msg3 according the set Msg3 transmit power.

Preferably, after the maximum transmit power is set according to the enhanced coverage level which UE belongs to, further comprises: receiving information of the specific maximum transmit power configured by the base station for the UE, and re-setting the maximum transmit power according to information of the specific maximum transmit power.

In accordance with another aspect of the disclosure, a user equipment for power control is provided. The user equipment includes: a coverage level acquisition module to acquire an enhanced coverage level which UE belongs to, a transmit power determination module to determine, according to type of enhanced coverage level, and a transmit power corresponding to the type of enhanced coverage level.

Compared with the conventional art, the technical effect of the disclosure comprises: for the equipment in deep coverage, a larger transmit power is allowed to be used to transmit the uplink signal. In the case of no interference to other cells, the power of the base station for receiving signal in this cell is promoted, the performance of the receiver is improved, consequently, the power consumption of the terminal is decreased. Additionally, a large power hopping is avoided, which is a result of continuing to use the second enhanced coverage level and directly using the maximum transmit power of the second enhanced coverage level, while the maximum attempt fail number of the NPRACH transmission of the first enhanced coverage level is reached, but the maximum transmit power of this enhanced coverage level is not reached. In the case of UE channel in good condition, if the transmit power directly hops to the maximum transmit power of the second enhanced overage level, all the signals transmitted on NPRACH resource at the second enhanced coverage level will be submerged.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, in various embodiments of the disclosure, hardware approaches will be described as an example. However, various embodiments of the disclosure include a technology that uses both hardware and software and thus, the various embodiments of the disclosure may not exclude the perspective of software.

Hereinafter, the disclosure describes technology for semi-persistent scheduling (SPS) and power control in a wireless communication system.

The terms a signal, the terms referring to a channel, the terms referring to control information, the terms referring to a network entity, and the terms referring to elements of a device used in the following description are used only for convenience of the description. Accordingly, the disclosure is not limited to the following terms, and other terms having the same technical meaning may be used.

Further, although the disclosure describes various embodiments based on the terms used in some communication standards (for example, 3rd generation partnership project (3GPP)), they are only examples for the description. Various embodiments of the disclosure may be easily modified and applied to other communication systems.

Figure 1:
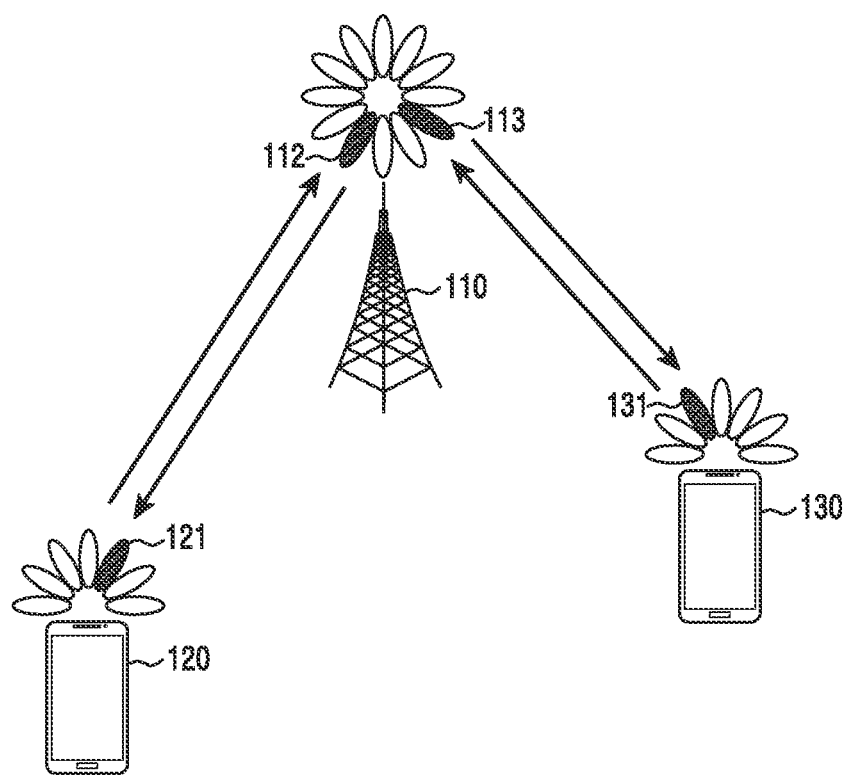
FIG. 1 illustrates a wireless communication system according to various embodiments of the disclosure.

FIG. 1 illustrates a wireless communication system according to various embodiments of the disclosure.

In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)", "eNodeB (eNB)", "5th generation (5G) node", "wireless point", "transmission/reception point (TRP)", as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)", "mobile station", "subscriber station", "remote terminal", "wireless terminal", or "user device", as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi-co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
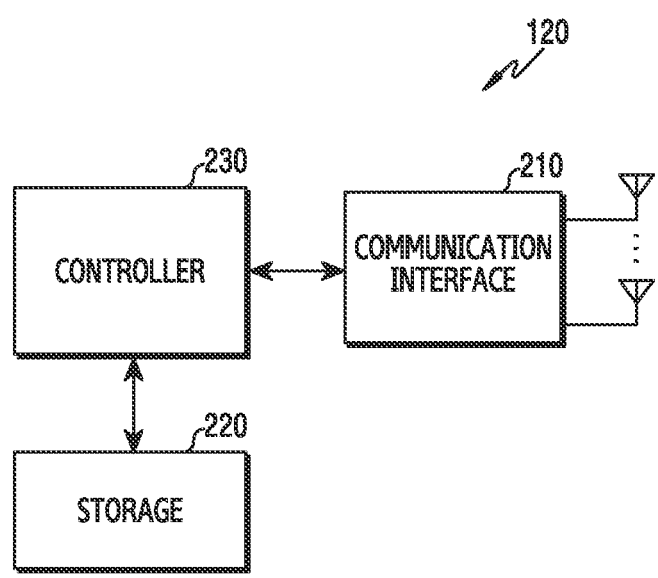
FIG. 2 illustrates a terminal in the wireless communication system according to various embodiments of the disclosure.

FIG. 2 illustrates the terminal in the wireless communication system according to various embodiments of the disclosure.

A structure exemplified at FIG. 2 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 2, the terminal 120 includes a communication interface 210, a storage unit 220 (e.g., a memory), and a controller 230 (e.g., at least one processor).

The communication interface 210 performs functions for transmitting/receiving a signal through a wireless channel. For example, the communication interface 210 performs a function of conversion between a baseband signal and bitstreams according to the physical layer standard of the system. For example, in data transmission, the communication interface 210 generates complex symbols by encoding and modulating transmission bitstreams. Also, in data reception, the communication interface 210 reconstructs reception bitstreams by demodulating and decoding the baseband signal. In addition, the communication interface 210 up-converts the baseband signal into an RF band signal, transmits the converted signal through an antenna, and then down-converts the RF band signal received through the antenna into the baseband signal. For example, the communication interface 210 may include a transmission filter, a reception filter, an amplifier, a mixer, an oscillator, a digital to analog converter (DAC), and an analog to digital converter (ADC).

Further, the communication interface 210 may include a plurality of transmission/reception paths. In addition, the communication interface 210 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a digital signal processor (DSP)). The communication interface 210 may include a plurality of RF chains. The communication interface 210 may perform beamforming.

The communication interface 210 transmits and receives the signal as described above. Accordingly, the communication interface 210 may be referred to as a "transmitter", a "receiver", or a "transceiver". Further, in the following description, transmission and reception performed through the wireless channel is used to have a meaning including the processing performed by the communication interface 210 as described above.

The storage unit 220 (e.g., a memory) stores a basic program, an application, and data such as setting information for the operation of the terminal 120. The storage unit 220 may include a volatile memory, a non-volatile memory, or a combination of volatile memory and non-volatile memory. Further, the storage unit 220 provides stored data in response to a request from the controller 230.

The controller 230 controls the general operation of the terminal 120. For example, the controller 230 transmits and receives a signal through the communication interface 210. Further, the controller 230 records data in the storage unit 220 and reads the recorded data. The controller 230 may performs functions of a protocol stack that is required from a communication standard. According to another implementation, the protocol stack may be included in the communication interface 210. To this end, the controller 230 may include at least one processor or microprocessor, or may play the part of the processor. Further, the part of the communication interface 210 or the controller 230 may be referred to as a communication processor (CP). For example, the controller 230 may control the terminal to perform operations according to the various embodiments of the disclosure.

Narrow band internet of things (NB-IoT) is one of important branches of Internet of things, wherein the NB-IoT can be arranged in cellular network, such as global system for mobile communications (GSM), universal mobile telecommunications system (UMTS), long term evolution (LTE) or other systems. For the NB-IoT arranged in the LTE network, in order to support the enhanced coverage scene of enhanced machine type communication (eMTC) or massive machine type communication (mMTC) application, and satisfy a requirement of high reliability (for example, ultra-reliable and low latency communications (URLLC)), it is required to use a way of repetition to transmit. Since the repetition transmission occupying a large amount of channel resource of physical downlink control channel (PDCCH), the key for designing a high efficient NB-IoT is to reduce the overheads of downlink channel resource.

LTE system achieves an uplink synchronize non-adaptive retransmission by the physical hybrid automatic repeat request (HARQ) indication channel (PHICH), however, PHICH requires to reserve resource, which still causes a wastage of downlink channel resource. And more, the reliability of the PHICH, without the protection of cyclic redundancy check (CRC), is lower than that of PDCCH, thus, the design of NB-IoT fails to introduce a PHICH channel for transmitting uplink acknowledgement (ACK)/negative-ACK (NACK).

The SPS is a technology mainly used for reducing overhead of PDCCH channel in the LTE voice service. In the SPS technology, the time-frequency resource (comprises uplink and downlink) of the system is required to be assigned or specified only once by the PDCCH channel, and then the same time-frequency resource can be reused periodically. Firstly, the system configures the parameters of the SPS mode by the radio resource control (RRC) signaling of high layer, the period of SPS is specified at the same time, then, the SPS mode is activated by means of the base station assigning corresponding resource for the UE in PDCCH channel, and UE saves the corresponding resource assignment, which is reused in the subsequent scheduling period, while, the data for adaptive retransmitting requires to re-assign resource by the PDCCH channel. In the subframe of the SPS transmission, the base station can also re-assign corresponding resource for transmission by the PDCCH channel. Finally, the base station releases SPS by the indication of PDCCH channel.

However, SPS scheduling of existing LTE system can only reduce the overhead of downlink scheduling, while, the base station needs to transmit a downlink control information (DCI) of a same size of format length as usual and the UE needs to monitor and detects a PDCCH search space for the same payload size of DCI format, which cannot provide power saving. Besides, after the existing SPS scheduling mode is activated, another scheduling is necessary to schedule a retransmission. This means that, the scheduled resource cannot be directly used for retransmission after SPS activation. Therefore, the original SPS is not suitable for NB-IoT system, which has massive amount of transmission and retransmission. In the meanwhile, the downlink channel scheduling overhead is increased for the scheduling for retransmission. For the above reasons, it is necessary to provide a method and user equipment for wireless communication resource scheduling, which is capable solve the above technical problems.

In particular, UE is required to monitor PDCCH and physical downlink shared channel (PDSCH) scheduled by the PDCCH to obtain paging information in the LTE system or NB-IoT system. At most of time, the paging information borne in PDSCH does not contain information of this UE, so power consumption of the UE for decoding PDCCH and PDSCH is wasted. There is similar condition in DRX of connected state, that is, when UE monitors PDCCH, no PDCCH of this UE exists. For reducing the power consumption of UE, it is necessary to provide a save-power paging or DRX monitoring mechanism and user equipment.

Besides, with respect to some terminals of Internet of things, due to the requirement of service, they are arranged inside the room, or in basement, leading to them a poorer channel condition compared with common wireless communication terminal. 3GPP designs NB-IoT system in Rel-13 and Rel-14, and introduces a new type of terminal of the eMTC in the LTE system, as well introduces coverage enhancement feature for LTE terminal. For NB-IoT terminal, three enhanced coverage levels are defined and the configuration of each coverage level is broadcast by system information. With respect to eMTC, two types of coverage levels are defined (coverage enhancement (CE) mode A and CE mode B). In the LTE and NB-IoT system, the base station configures the maximum transmit power of UE. At present, no matter under what coverage condition, NB-IoT system and eMTC system both comply with the maximum value of this configuration. However, for the UE in enhanced coverage level, its capability is not taken into effect well, resulting in that the uplink channel needs more time to transmit, which can be transmitted successfully formerly in a very short time. In this way, not only the resource is wasted, but also causing a large damage to the power consumption of UE.

Therefore, it is advantageous to design a method for power control, to enable the UE in poor channel condition to transmit a maximum transmit power as much as the UE can.

Figure 3:
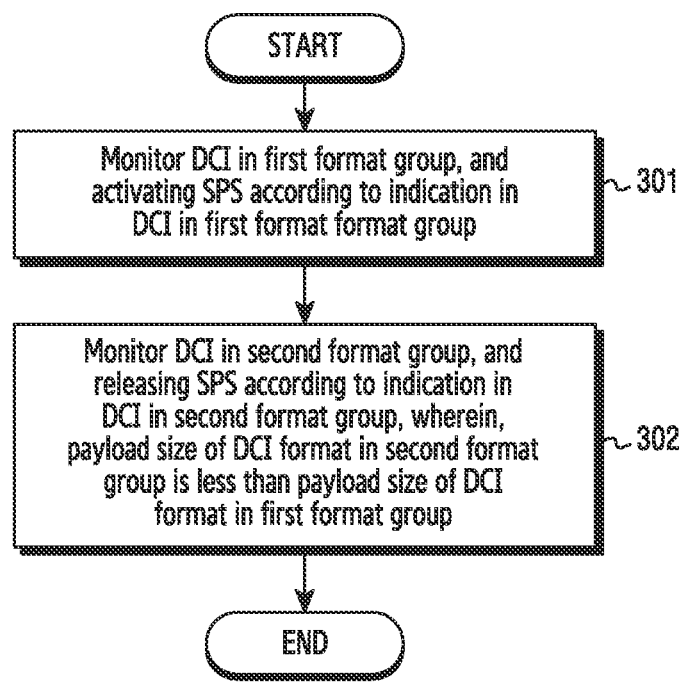
FIG. 3 is a flowchart diagram of a method for semi-persistent scheduling (SPS) according to various embodiments of the disclosure.

FIG. 3 is a flowchart diagram of a method for SPS according to various embodiments of the disclosure. The embodiment of a method for SPS, referring to FIG. 3, comprises following operations.

Referring FIG. 3, in operation 301, a UE monitors DCI in a first format group, and activating SPS according to an indication in the DCI in the first format group. In operation 302, the UE monitors DCI in a second format group, and releases SPS according to an indication in the DCI in the second format group. Herein, the payload size of the DCI format in the second format group is less than the payload size of the DCI format in the first format group. Herein, the payload size of DCI format denotes the number of information bits in DCI, which is also called DCI format length.

Figure 4:
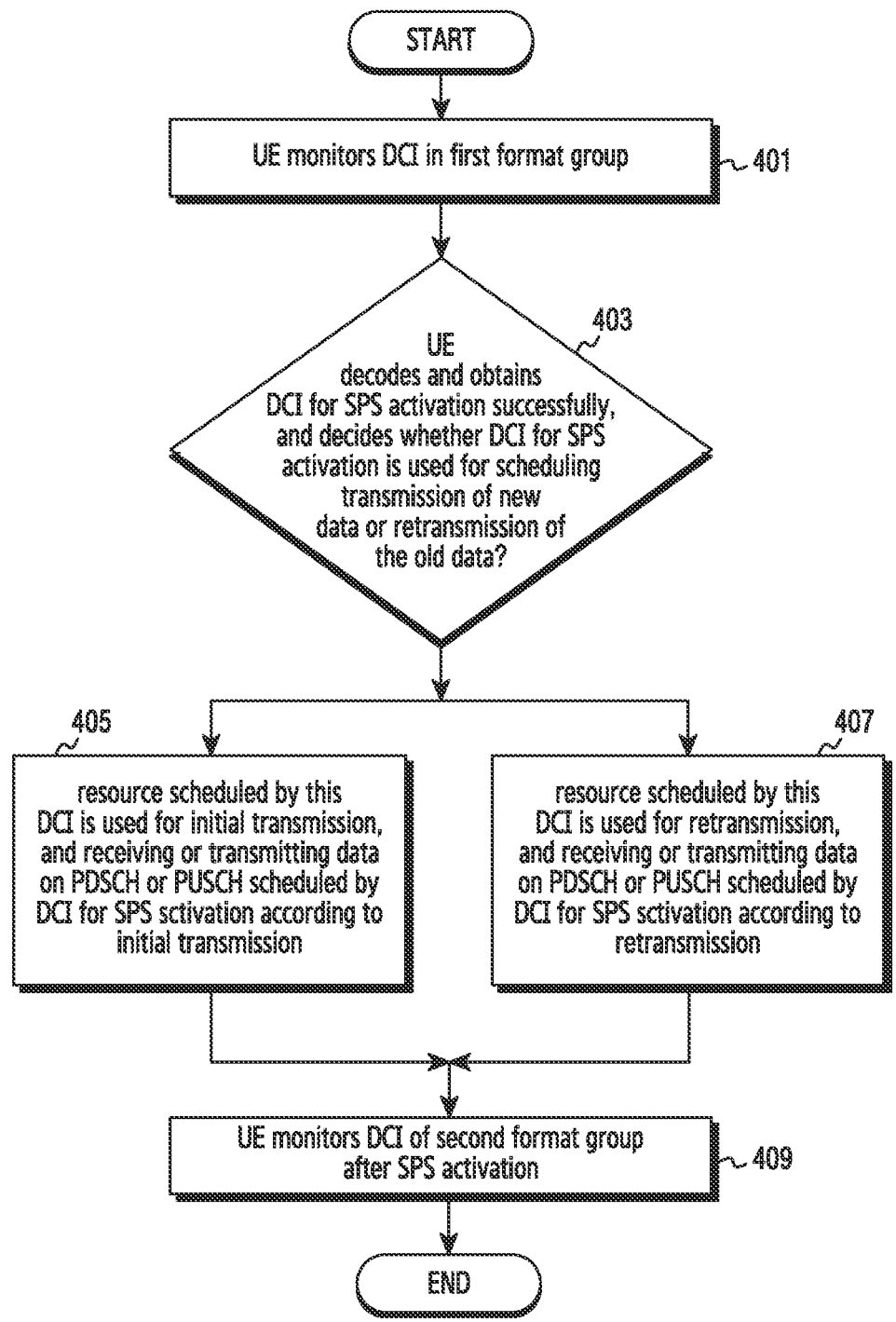
FIG. 4 is a flowchart diagram of a SPS activation process according to various embodiments of the disclosure.

Referring to FIG. 4, an embodiment of the activation process of SPS will be illustrated firstly below. FIG. 4 is a flowchart diagram of a SPS activation process according to various embodiments of the disclosure.

Referring FIG. 4, in operation 401, a UE monitors PDCCH channel and monitors DCI in the first format group. If the UE successfully decodes the DCI and pass the CRC check scrambled by SPS cell radio network temporary identifier (C-RNTI) and the further validation is achieved (for example, verifying whether the values of some fields in DCI are comply with requirements), the DCI is treated as a DCI for SPS activation. Herein, SPS C-RNTI is a certain RNTI configured by the base station through RRC.

In operation 403, the UE decides the transmission format of the resource (PDSCH channel and/or physical uplink shared channel (PUSCH) channel) scheduled by DCI for SPS activation, that is, whether the resource is used for initial transmission (denoted by new data below), or is used for retransmitting (denotes by old data). If the resource scheduled by DCI for SPS activation is used for scheduling the transmission of a new data, in operation 405, the UE receives or transmits a new data is performed on the resource indicated by the DCI for SPS activation. If the resource scheduled by DCI for SPS activation is used for scheduling the transmission of an old data, in operation 407, the UE receives or transmits a retransmitted old data is performed on the resource indicated by the DCI for SPS activation. The base station can configure different radio network temporary identifiers (RNTIs) to the UE for distinguishing UL and DL transmission. Alternatively, the base station can use DCI to indicate UL or DL transmission. In operation 409, the UE monitors the PDCCH channel and monitors DCI in the second format group after the SPS is activated.

Herein, one type of DCI format group can comprise one type or a multiple of types of DCI format(s), and the DCI size of a multiple of types DCI format can be the same or different. For the first format group, preferably it comprises one type or two types DCI format(s). For the second format group, preferably it comprises one type DCI format. In this way, the blind detection for DCI by UE will not be more complicated, and the power consumption result of the UE performing blind detection will be reduced. One type of DCI format can be a format used for scheduling uplink data transmission, can also be a format used for scheduling downlink data transmission. For example, the first format group can comprise any one type or two types of N0, N0-A, N1, N1-A, N2 and N2-A, wherein, N0 and N0-A are the format which is used for scheduling uplink data, and N1 and N1-A are the format, which is used for scheduling downlink data, bearing single cell-multicast traffic channel (SC-MTCH) or informing the changes of single cell-multicast control channel (SC-MCCH). N2 and N2-A are the format, which is used to paging channel, indicating the DCI of system information change directly, scheduling NPDSCH for bearing SC-MCCH or informing the change of SC-MCCH. The second format group comprises any one type of N0-B, N1-B and N2-B, wherein, N0-B is the format used for scheduling uplink data, N1-B is the format used for scheduling downlink data, and N2-B is the format used for paging channel or SC-MCCH.

The size of payload (number of bits) of DCI format in the second format group is less than that (number of bits) of the DCI format in the first format group. For example, the format length of N0-B, N1-B and N2-B all are less than the format length of any one of N0, N0-A, N1, N1-A, N2 and N2-A.

For example, DCI format in the second format group is obtained by omitting part of field in the DCI format in the first format group. For instance, the DCI format in the second format group only contains repetition number field of the data channel (PDSCH and/or PUSCH) and new data indicator (NDI) field.

For another example, if the SPSs of UL and DL are activated at the same time, DCI format in the second format group can further contain the field for distinguishing the uplink scheduling and downlink scheduling. For the downlink scheduling, it can further contain the field indicating the HARQ-ACK resource to transmitting ACK/NACK (denoted by HARQ-ACK resource field below), or further contain one or multiple of scheduling delay field (including starting position of time domain resource and/or occupied time duration), resource assignment field (including occupied frequency domain resource location) or modulation coding scheme field. For the uplink scheduling, it can be further contained one or multiple of the subcarrier indication field, resource scheduling field, scheduling delay field, modulation coding scheme field and redundancy version field.

In another example, the payload size of DCI in the second format group is the same as that of DCI in the first format group. In this time, monitoring for the DCI format in the second format group is not used for reducing UE power consumption. However, it can reduce DL overhead by sharing the resource by multiple users. For example, the DCI format in the second format group can be a format shared by multiple users, wherein, each user can obtain the field corresponding to itself by calculation, wherein, ACK/NACK information of one or multiple of HARQ can be carried by the field corresponding to itself, wherein, the ACK/NACK information of the HARQ can be single state (ACK or NACK) or multiple states (ACK and NACK). Further, the information of frequency hopping or triggering can be carried by the field corresponding to itself.

In extreme condition, the DCI format in the second format group can be degraded into 1-bit information, that is, sequence or waveform specified by one UE, for example, a scrambled RNTI sequence. The RNTI can be specified by user, user group or cells. This one bit or new DCI format with very few bits can be suitable to uni-cast or broadcast (such as, paging information and system information) or multicast information (SC-MCCH or SC-MTCH in Single Cell Point To Multi-point (SC-PTM)).

Figure 5:
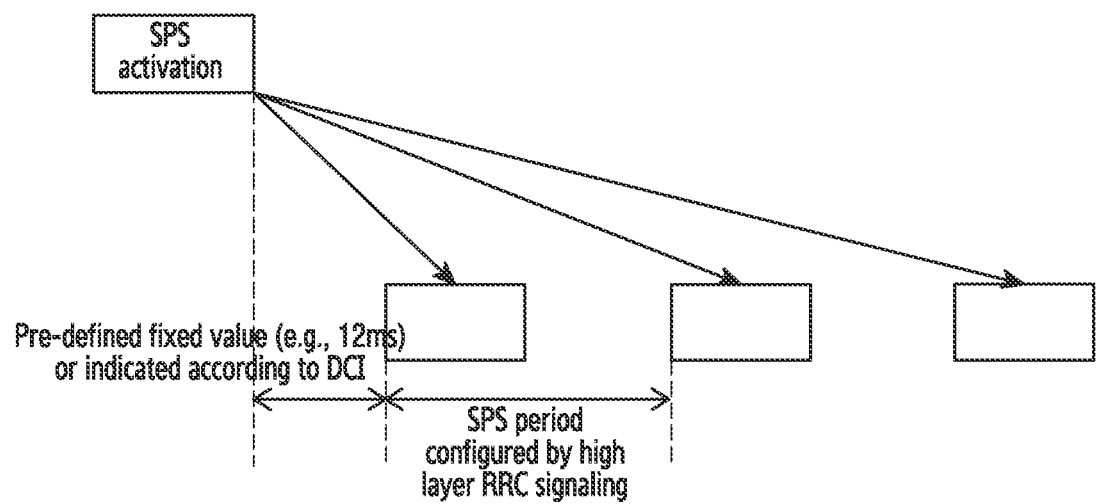
FIG. 5 is a schematic diagram of a SPS scheduling time-delay according to various embodiments of the disclosure.

Please refer to FIG. 5, and for scheduling delay, the starting position of PUSCH can be a predefined value.

FIG. 5 is a schematic diagram of a SPS scheduling time-delay according to various embodiments of the disclosure.

For example, the starting position of PUSCH/PDSCH transmission is at a fixed time after the ending subframe of PDCCH carrying the DCI for SPS activation (e.g., transmitting on PUSCH after 8 ms or receiving on PDSCH after 4 ms). This fixed time can be pre-defined/pre-indicated in the specification, or be configured by the high layer RRC signaling. Scheduling delay can also be indicated by DCI for SPS activation (reserving scheduling delay field for this situation). In this specification, the time unit of scheduling delay can be absolute time (e.g., ms), or symbol/slot/subframe, or valid symbol/slot/subframe (e.g., uplink subframe or downlink subframe, or valid subframe configured by base station). For the simplification, in the following specification, the time domain unit for scheduling delay or time domain location and so on use subframe as an example. For example, starting position for the first transmission of PUSCH/PDSCH scheduled by SPS is indicated by scheduling delay field in DCI, hereafter, starting position of each time of period transmission is the starting position for the first transmission of PUSCH/PDSCH adding a fixed value (such as 20 ms, 40 ms and 80 ms, and so on), wherein, the fixed value is configured by high layer RRC signaling. Alternatively, the period of SPS is a multiple of PDCCH period (PDCCH period (PP)), e.g., 1PP, 2PP, 4PP, 8PP, and so on. Besides, for supporting a longer SPS period, the configuration of period can be configured in a manner of incorporating multiple dimensions, such as hyper-frame, radio frame, subframe, slot, symbol, and so on. The SPS period is achieved by dynamical scheduling (new DCI field). For example, one DCI can schedule multiple of positions of time-frequency resource (or location of time-domain resource), adopt the same frequency-domain resource, or perform frequency hopping by a manner of pre-configuration, to obtain frequency-domain resource.

SPS with longer period can be used to paging information. In order to record SPS period even the UE is in idle state, the period configuration information of SPS can be configured to the UE through core network. For the case of using SPS scheduling resource for paging, UE can decide whether itself is called or not by detecting whether there is a UE identifier of UE itself. This identifier can be achieved by one type of sequence, or be indicated by the information borne in PDSCH or PDCCH, or be indicated by one type of scrambled RNTI. Besides, the identifier can be indicated by PDSCH or PDCCH as well as different scrambles of RNTI. Similarly, this SPS can be used in DRX, and UE can monitor downlink data information directly without monitoring PDCCH.

For the DCI subframe repetition number field, the starting position of scheduled PUSCH or PDSCH can be determined by the starting position of PDCCH or the starting position of PDCCH search space, or a pre-defined (or configured by high layer RRC signaling) starting position (such as, subframe, frame, etc.). In this condition, the DCI subframe repetition number field can be configured as a pre-defined value, for example, they are all "0" or all "1", while, there is no need to decide the initial transmission position of PDSCH or PUSCH by the end position of PDCCH.

Figure 6:
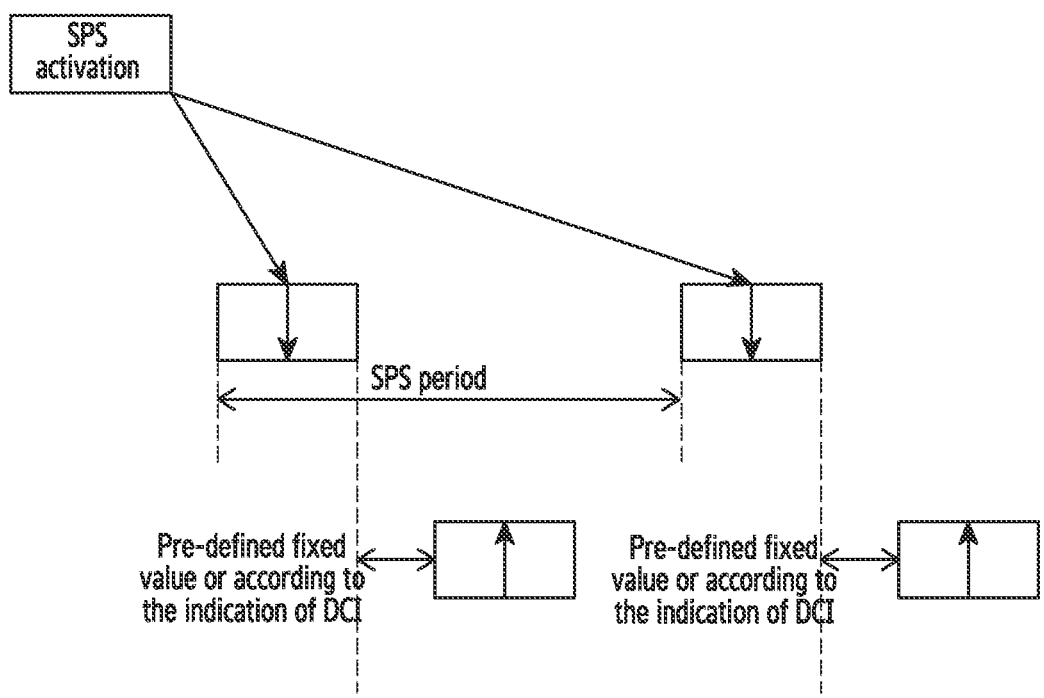
FIG. 6 is a schematic diagram of hybrid automatic repeat request (HARQ) feedback of SPS according to various embodiments of the disclosure.

FIG. 6 is a schematic diagram of hybrid automatic repeat request (HARQ) feedback of SPS according to various embodiments of the disclosure.

As shown in FIG. 6, for HARQ-ACK resource field(s), the resource location (including time domain and/or frequency domain) of ACK/NACK information of the HARQ feed back to the data received on PDSCH can be configured as pre-defined value. For example, HARQ-ACK resource field(s) is configured as all "0" or not existed). For example, when the time-domain position is transmitted on 13th subframe after PDSCH, the frequency-domain resource is sub-carrier 45 (when the sub-carrier interval is 3.75 kHz), or subcarrier 0 (when the sub-carrier interval is 15 kHz). As shown in the Table 1, the HARQ-ACK resource field(s) in DCI format N1 is configured as "0000". Alternatively, the time-domain or frequency-domain or time-frequency-domain resource of HARQ-ACK feedback for PDSCH can be configured by high layer RRC signaling, for example configured by SPS-Config information, or SPS-ConfigDL information, or SPS-ConfigUL information. Besides, the resource location of ACK/NACK information can be determined by HARQ-ACK resource field(s), for example, through only fixing the resource location of time-domain or frequency-domain, and the corresponding variable frequency-domain or time-domain resource location can be indicated by HARQ-ACK resource field(s). Table 1 represents examples of the special field configuration in DCI for SPS activation.

TABLE 1

|  | DCI format N0 | DCI format N1 |
|---|---|---|
| Scheduling delay | set to '00' | set to '000' |
| Redundancy version | set to '0' | set to '00' |
| HARQ Process number (if it exists, e.g., Rel-14) | Set to '0' | Set to '0' |
| HARQ-ACK resource(s) | NA | Set to '0000' |

For the redundancy version: when SPS is for new data transmission, redundancy version (if it exists) can be fixed, e.g., RV 0. When the retransmission is triggered by DCI scrambled by, e.g., C-RNTI, the redundancy version can be changed to increase the decoding performance. When the SPS is used for old data retransmission, there is no need to extra indicate redundancy version. The redundancy version of each retransmission or repetition can be round-robin in the pre-defined sequence (for example, 0, 1, 0, 1 . . . ).

SPS may be applied to a scene with well signal coverage condition, where in this condition, the repetition number field of the data channel (PDSCH and/or PUSCH) in DCI must be limited to less than a certain fixed value. When the repetition number of the data channel in DCI is larger than the fixed value, the UE considers that the validation is failed and SPS fails the validation. Similarly, only when the repetition number (if it exists) of DCI is less than a fixed value, then the SPS is validated.

For NDI field, UE decide whether the resource scheduled by DCI for SPS activation is used for new data transmission or for old data retransmission. If the resource is used for new data transmission, the new data is received or transmitted on the scheduled resource indicated by the DCI for SPS activation, and HARQ process is performed according to new transmission. If the resource is used for old data retransmission, the old data is received or transmitted on the scheduled resource indicated by the DCI for SPS activation, and HARQ process is performed according to old data, for example, performing a combination operation after receiving the old data retransmission, or re-reading the buffer in HARQ entity and retransmitting the old data.

For HARQ process number field, UE decides the HARQ process number according to the deciding of whether there are multiple HARQ process is activated; if there is no multiple HARQ process is activated, it is regarded there is only one HARQ; if multiple HARQ processes are activated, the UE further determines the HARQ process number. When there are multiple HARQ processes, NDI in DCI for SPS activation is suitable to multiple processes, that is, NDI is used to decide the new data transmission and old data retransmission for multiple processes. However, when one or multiple of the HARQ process is/are a first-time transmission, it is considered to be a new transmission. Besides, when supporting multiple HARQ processes, the ACK/NACK feedback of multiple HARQ processes of one user can be carried in the DCI format in the second format group. For example, for the UE supporting multiple HARQ processes, UE reuses the method for deciding HARQ process number in LTE to decide HARQ process number, i.e., HARQ Process ID=[floor(CURRENT_TTI/semiPersistSchedIntervalDL)] modulo numberOfConfSPS-Processes, wherein, CURRENT_TTI=[(SFN*10)+subframe number]. Or, the indication of HARQ process number in DCI can be kept, especially for the SPS scheduling for retransmitting. In this way, the retransmission of two HARQ processes can be performed in an interlaced manner. More specifically, in the NB-IoT system of Rel-14 version, at most two HARQ processes are supported, and at this moment, numberOfConfSPS-Processes can be configured as 2 at most.

For the bandwidth part (BWP) indicator field, it can be kept in DCI for activation to indicate the frequency domain location of activated BWP. Alternatively, it can be not kept in DCI for activation (e.g., omitted or set to a default value). In this time, the BWP for SPS transmission can be the activated BWP, alternatively, it can be configured by the high layer. This also applies to the uplink transmission without DCI for activation.

For the supplementary uplink (SUL) and UL carrier indicator field, it could also be kept in DCI for SPS activation. Similar as the scheduling-based uplink transmission, the field can be used for activated uplink SPS on SUL or UL.

After the SPS is activated successfully, UE monitors DCI in the second format group. When UE monitors DCI in the second format group, UE can monitor the UE specific search space, or cell-specific search space or UE group-specific search space. UE can use SPS C-RNTI and/or C-RNTI to decode when monitoring DCI in the second format group, or uses a RNTI specified by a UE group, or uses a N-RNTI to decode which is differs from SPS C-RNTI or C-RNTI.

Further, after SPS is activated successfully, UE can monitor DCI in the first format group and DCI in the second format group, simultaneously. The two types of DCI format can be transmitted in the same PDCCH search space or different PDCCH search spaces, for example, different Rmax (maximum repetition number), starting pointer position of different search spaces (e.g., different offset), different search space type (e.g., UE specific search space, cell-specific search space and UE group-specific search space).

Figure 7:
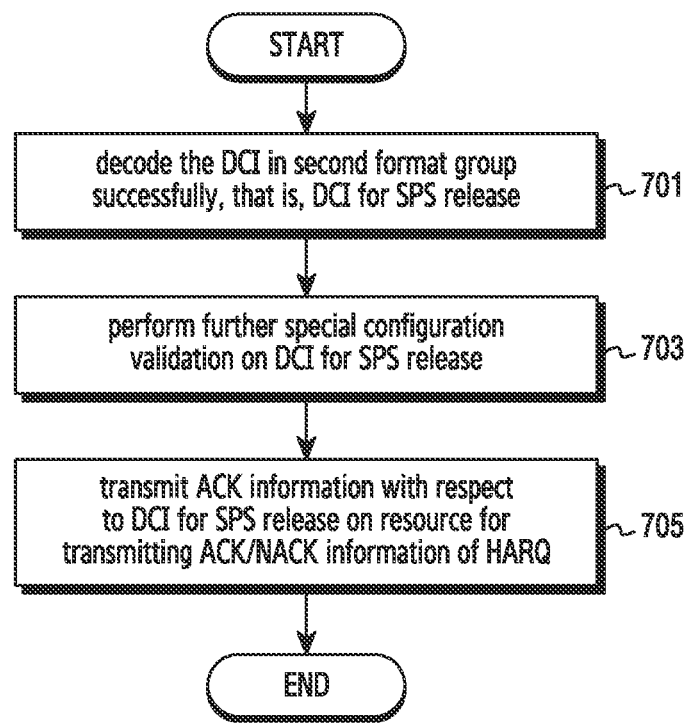
FIG. 7 is a flowchart diagram of a SPS release process according to various embodiments of the disclosure.

Please refer to FIG. 7, and the release process of SPS in the embodiment is introduced below. FIG. 7 is a flowchart diagram of a SPS release process according to various embodiments of the disclosure.

Referring FIG. 7, in operation 701, a UE monitors PDCCH channel and monitors DCI in the second format group. In operation 703, the UE performs further special configuration validation on the DCI for SPS release. If UE successfully decodes DCI scrambled by SPS C-RNTI and pass the CRC check and the further validation is achieved (e.g., verifying whether the values of some fields comply with requirements), the DCI is treated as a DCI for SPS release, and, in operation 705, transmits ACK information for releasing SPS on the resource for transmitting ACK/NACK information of HARQ, to avoid a dislocation understanding between the base station and UE to SPS.

Similar to DCI for SPS activation, SPS can release some fields in DCI without indications, for example, at least one or more of HARQ process number field, subcarrier indicating field (frequency-domain resource of PUSCH), resource assignment field, scheduling delay field, redundancy version field, modulation coding scheme field and DCI subframe repetition number field, SUL or UL indicator field and BWP indicator field, as shown in table 2. Table 2 represents the examples of special field configuration in DCI for SPS release.

TABLE 2

|  | DCI format N0 | DCI format N1 |
| --- | --- | --- |
| Scheduling delay | set to '00' | set to '000' |
| HARQ process number (if it exists, e.g. Rel-14) | set to '0' | set to '0' |
| Subcarrier indication | Set to all '1's | NA |
| Resource assignment | Set to all '1's | Set to all '1's |
| Redundancy version | set to '0' | NA |
| Repetition number | set to '000' | set to '0000' |
| Modulation and coding scheme | set to '1111' | set to '1111' |
| DCI subframe repetition number | set to '00' | set to '00' |
| SUL or UL indicator | set to '0' | NA |
| BWP indicator | set to all '1' | set to all '1' |

UE transmits ACK information for releasing SPS (i.e., the resource for transmitting ACK/NACK information of HARQ, including time domain and/or frequency domain resource), which is indicated by the DCI for SPS release, or configured by the high layer RRC signaling, or is a pre-defined value (e.g., pre-defined in specification).

Figure 8:
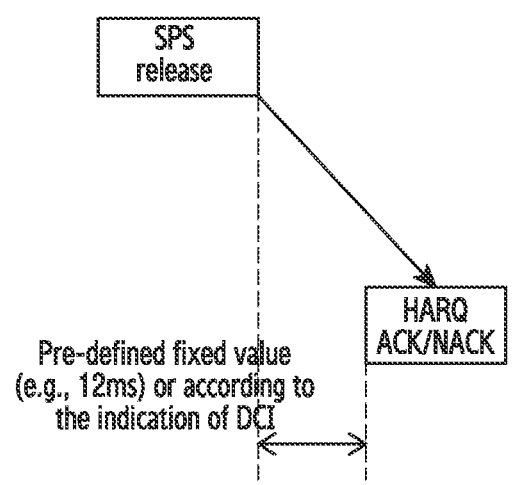
FIG. 8 is a schematic diagram of ACK feedback information of SPS release downlink control information (DCI) according to various embodiments of the disclosure.

FIG. 8 is a schematic diagram of ACK feedback information of SPS release DCI according to various embodiments of the disclosure.

Please refer to FIG. 8, when the resource for UE transmitting ACK information for releasing SPS is indicated by the DCI for SPS release, the time-domain position of UE can be determined by transmission position of PDCCH, for example, UE starts to transmit the ACK information for releasing SPS in t subframes after the last subframe of PDCCH transmission, wherein, t is indicated by HARQ-ACK resource field in DCI format N1, meantime, HARQ-ACK resource field indicating the position of frequency-domain subcarrier. For the DCI format N0 for indicating PUSCH transmission, there is no HARQ-ACK resource field, in this condition, the subcarrier indication field and scheduling delay field in DCI format N0 to indicate the time-frequency resource can be kept, or it is achieved by rewriting some fields in DCI format N0. For example, 4 bits in 6 bits of subcarrier indication field, or 4 bits in modulation coding scheme field, or a combination of one or multiple following fields: subcarrier indication field, resource assignment field, scheduling delay field, modulation and demodulation field, redundancy version field, repetition number field, DCI subframe repetition number field, and so on.

When the resource for UE transmitting ACK information for releasing SPS is configured by high layer RRC signaling, such as, configured by SPS-Config information, SPS-ConfigDL information or SPS-ConfigUL information. Further, for another example, the frequency-domain resource is configured by high layer RRC signaling, while, the time-domain resource is indicated by DCI (for instance, reusing scheduling delay field, etc.).

The retransmission application of SPS will be introduced below, that is, HARQ retransmission application between the SPS activation and SPS release. What is needed to illustrate is that method for semi-persistent scheduling (SPS) in the embodiment can transmit new data on the first scheduling resource after SPS activation, and start to transmit the old data to be retransmitted on a certain scheduling resource after the first scheduling resource; as well can transmit the old data to be retransmitted on all of resources from the first scheduled resource after SPS activation to the last scheduled resource before SPS release, to reduce the scheduled downlink channel overhead.

Besides, the semi-persistent scheduling method in the embodiment supports SPS dynamic scheduling similar to LTE, that is, in the SPS transmission process, the base station can re-assign corresponding resource (such as time-frequency position and period of the resource, etc.) to transmit by means of DCI, wherein, the difference lies in UE monitoring the DCI in the second format group in this embodiment.

Figure 9:
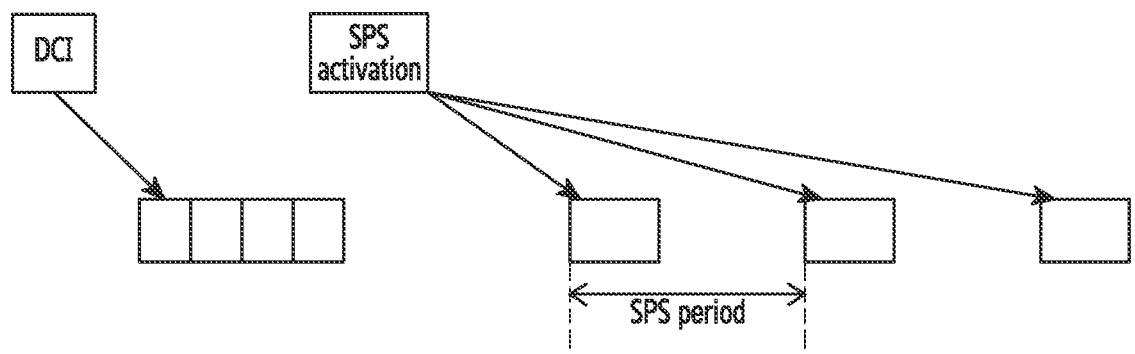
FIG. 9 is a schematic diagram of SPS dynamic scheduling according to various embodiments of the disclosure.

FIG. 9 is a schematic diagram of SPS dynamic scheduling according to various embodiments of the disclosure.

As shown in FIG. 9, UE successfully decodes a DCI scrambled by C-RNTI, wherein, 4 times retransmission is indicated. Subsequently, UE successfully decodes a SPS activation, wherein, only once retransmission is indicated. In the interval of SPS period, UE or base station can verify whether the retransmission is accepted successfully, and feed the ACK information back to stop transmission, or send out a new transmission by feeding back ACK information.

For the SPS scheduling of the uplink data transmission, if it is determined that transmission format determined by DCI for SPS activation is new data, UE transmits the new data on the resource assigned by SPS; until corresponding NACK information is received, UE transmits retransmitted old data on resource assigned by SPS.

Figure 10:
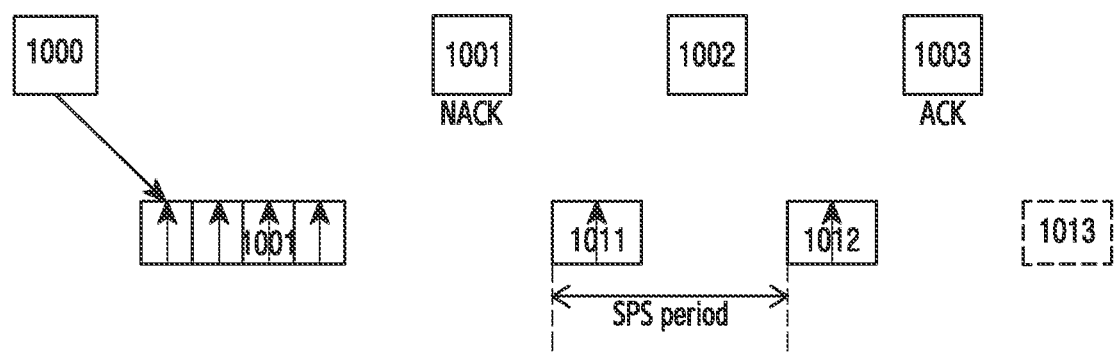
FIG. 10 is a schematic diagram of a type of HARQ retransmission application of SPS according to various embodiments of the disclosure.

Please refer to FIG. 10, the initial transmission is scheduled by PDCCH 1000, and retransmission is scheduled by downlink channel 1001. After transmitting new data (initial transmission) on the uplink channel, UE detects the downlink channel 1001 bearing the ACK/NACK information. If UE receives NACK information on the downlink channel 1001, then the retransmission is triggered, wherein, the repetition number of retransmission is not equal to the repetition number of initial transmission, or the repetition number is the same as the initial transmission. In the following process, UE transmits retransmitted old data on the resource assigned by SPS all the time, until the ACK information is received by UE, or maximum retransmission number is reached, or the UE reaches the last one resource assigned by SPS.

FIG. 10 is a schematic diagram of a type of HARQ retransmission application of SPS according to various embodiments of the disclosure.

In FIG. 10, UE detects the ACK information on the downlink channels 1001 and 1002, but the UE fails to detect the ACK information, then UE continues to retransmit on resource 1012. While, UE detects ACK information on downlink channel 1003, UE stops the retransmission.

For the SPS scheduling of uplink data transmission, if the transmission format determined by DCI for SPS activation is an old data, UE transmits the retransmitted old data on the resource assigned by SPS; until corresponding ACK information is received, UE stops to transmit retransmitted old data. This method can reduce signaling overhead and avoid resource wastage efficiently.

Please refer to FIG. 10, and the initial transmission is scheduled by PDCCH 1000, and retransmission is scheduled by downlink channel 1001. After UE has transmitted retransmitted old data on the uplink channel, UE detects the downlink channel 1001 bearing ACK/NACK information. If UE receives NACK information on downlink channel 1001, UE continues to retransmit on resource 1011. In the following retransmission process, UE detects NACK information on downlink channels 1001 and 1002, if UE fails to detect NACK information, then UE does not perform transmission on the whole subsequent resources after resource 1012. Or, in the following retransmission process, UE detects NACK information on downlink channels 1001 and 1002, if UE fails to detect NACK information, then UE does not perform transmission on the resource 1012; if UE successfully detects NACK information on the following downlink channel 1003, UE transmits the retransmitted old data on resource 1013. That is, after UE fails to detect NACK information, the following operations is valid only to one SPS, thus, this method can make the base station more flexible scheduling transmission.

The initial transmission is scheduled by PDCCH 1000, and retransmission is scheduled by downlink channel 1001 (explicitly or implicitly). After UE has transmitted data on the uplink channel, UE detects the downlink channel 1001 bearing ACK/NACK information. If UE receives ACK information on downlink channels 1001, or 1002 or 1003, then UE stops retransmitting from corresponding resources 1011, or 1012 or 1013. If UE fails to receive ACK information all the time, UE retransmits all the time until the maximum retransmission number is reached or the SPS is used exhaustively.

In the above examples, the parameters of time-domain position, frequency-domain position or time-frequency-domain position of resource 1001, and/or resources 1011, 1012 and 1013 are obtained by physical layer, for example DCI, such as, DCI in PDCCH 1000 or downlink channel 1001. The parameters of time-domain position, frequency-domain position or time-frequency-domain position of resource 1001 and/or resources 1011, 1012 and 1013 can also be configured by high layer RRC or media access control (MAC) signaling, or obtained by a method of combining high layer signaling configuration and physical layer indication. The repetition number of retransmission can be pre-defined, or be dynamically configured on downlink channel (e.g., 1001). The downlink channel 1001 can be PDCCH channel or PHICH channel for transmitting ACK/NACK information of HARQ.

For the SPS scheduling of downlink data transmission, if the transmission type determined by DCI for SPS activation is old data, UE receives and decodes retransmitted old data on resource assigned by SPS, until received retransmitted old data is decoded successfully and corresponding ACK information is transmitted, UE stops receiving retransmitted old data on resource assigned by SPS. Further, UE will continue to receive new data on resource assigned by SPS.

Figure 11:
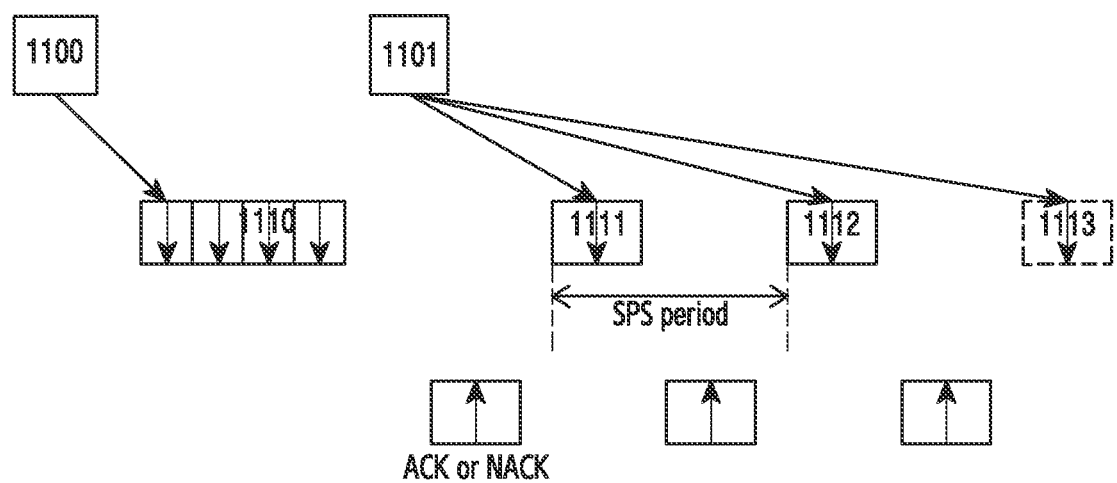
FIG. 11 is a schematic diagram of another type of HARQ retransmission application of SPS according to various embodiments of the disclosure.

FIG. 11 is a schematic diagram of another type of HARQ retransmission application of SPS according to various embodiments of the disclosure.

Please refer to FIG. 11, and UE obtains PDSCH initial transmission resource 1110 by PDCCH 1100. UE obtains PDSCH retransmission resources 1111, 1112 and 1113 by downlink channel 1100 and/or 1101. UE receives and decodes PDSCH (can be new data, or can be retransmitted old data) transmitted on 1110, if UE decodes PDSCH transmitted on 1110 successfully, then UE transmits ACK information, or UE does not transmit any information. If base station receives ACK information successfully, eNB will not transmit downlink channel 1101 to schedule retransmission of PSDCH. Correspondingly, UE does not expect SPS scheduling information, which is used for retransmission. Further, if it is new data that is transmitted on resource 1110, UE continues to receive and decode new data on resources 1111, 1112 and 1113. If it is retransmitted old data that is transmitted on resource 1110, then UE considers that retransmission resources 1111, 1112 and 1113 are released.

For SPS scheduling of the downlink data transmission, if the transmission format determined by DCI for SPS activation is a new data, UE receives new data on resource assigned by SPS, until UE fails to decode the received new data and transmit corresponding NACK information, UE receives retransmitted old data on resource assigned by SPS.

For the SPS scheduling of downlink data transmission, if the transmission format determined by DCI for SPS activation is an old data, UE receives and decodes retransmitted old data on resource assigned by SPS; if UE fails to decode the received retransmitted old data, UE transmits or does not transmit corresponding NACK information, and UE continues to receive retransmitted old data on resource assigned by SPS.

Please refer to FIG. 11, and UE obtains PDSCH initial transmission resource 1110 by PDCCH 1100. UE obtains PDSCH retransmission resources 1111, 1112 and 1113 by downlink channel 1100 and/or 1101. UE receives and decodes PDSCH (can be new data, or can be retransmitted old data) transmitted on 1110, if UE fails to decode PDSCH, then UE can process in the following two methods: (1) if it is new data that is transmitted on the resource 1110, UE transmits NACK information, the base station receives this NACK information successfully, the base station retransmits the old data, UE receives retransmitted old data on resource 1111 and subsequent resources; (2) if it is retransmitted old data that is transmitted on the resource 1110, UE transmits or does not transmit NACK information (e.g., DTX), the base station correspondingly receives or fails to receive this NACK information, the base station continues to retransmit the old data, UE continues to receive retransmitted old data on resource 1111 and the subsequent resources.

In the above examples, the parameters of time-domain position, frequency-domain position or time-frequency-domain position of resources 1111, 1112 and 1113 is obtained by the physical layer, for example, DCI, such as, DCI in PDCCH 1100 or downlink channel 1101. The parameters of time-domain position, frequency-domain position or time-frequency-domain position of resources 1111, 1112 and 1113 can also be configured by high layer RRC or MAC signal, or obtained by a method of combining high layer signal configuration and physical layer indication. The repetition number of retransmission can be pre-defined, or be dynamically configured on downlink channel (e.g., 1101). The downlink channel 1101 can be PDCCH channel or PHICH channel for transmitting ACK/NACK information of HARQ.

Besides, in order to maintain a low UE complexity, it can activate UL and SPS of DL meantime when activating SPS. Then UE can monitor payload size of one DCI, and obtain uplink scheduling or downlink scheduling for the same time. Alternatively, after SPS activation, on basis of reducing the number of original PDCCH monitored or maintaining the number of original PDCCH monitored, the UE extra monitors a DCI or wake-up signal with different size. The position of DCI monitored extra is predefined, or configured by high layer, or determined according to original PDCCH search space (e.g., the starting position of search space, or the ending position of search space) or position of each alternative PDCCH (starting position or ending position) in the original PDCCH search space. Specifically, for example, position of PDCCH monitored extra is start at the ending position of time-frequency position of each alternative PDCCH. When in the downlink scheduling, since eMTC may have a scheduling delay for 1 ms, NB-IoT has a scheduling delay for at least 4 ms, if a new small size PDCCH can be transmitted on the resource with scheduling delay, the downlink spectrum efficient can be improved to a large extent. Similarly, in the new radio (NR) system, if UE monitors the size of different DCIs, the search space of small DCI can be determined according to the search space of big DCI or the time-frequency resource location of alternative PDCCH.

In the NR system of 3GPP, a more flexible method for configuring frame structure is introduced. Firstly, slots and symbols for uplink transmission and downlink transmission are configured by RRC. And the UE can calculate the subframes and symbols which can be configured as flexible subframes and symbols between the uplink and downlink transmission periodicity (DL-UL-TransmissionPeriodicity). This (flexible) part can be indicated dynamically by the slot format indication (SFI). The SFI has a higher priority than semi-static configurations, such as the measurement, the channel state information (CSI) report, the transmission of Sounding Reference Signal (SRS) and SPS uplink transmission (it is also called a grant free uplink transmission or the uplink transmission based on configured grant or semi-persistent scheduling) and the SPS downlink transmission. This is, when the UE obtains the SPS uplink (or downlink) configuration by the RRC, the UE can transmit the uplink signal (or receive the downlink signal) on the uplink (or downlink) slot or symbol of semi-static configuration in the direction same to uplink transmission direction (downlink transmission direction). Similarly, for the uplink (or downlink) SPS activated by the DCI, the first resource indicated by the DCI can be regarded as the resource dynamically scheduled by the DCI, and the subsequent SPS resources are all regarded as measurements, whose priority is lower than SFI. The priority of the resource dynamically scheduled by DCI is higher than that of resource rewrote by the SFI (but all of those cannot be conflicted with the uplink and downlink direction of RRC semi-static configuration). The same principle can also be suitable to the uplink HARQ-ACK resource used for transmitting the first DL SPS indicated according to DCI, that is, its priority is higher than that of SFI, and the direction of uplink and downlink of SFI or flexible subframe/slot/symbol can be rewrote, while the priority of other uplink resources for transmitting HARQ-ACK feedback is the same with that of measurement, which can be rewrote by the SFI. Or, the priority of the uplink resource for transmitting HARQ-ACK feedback is equal to the priority of measurement which can be rewrote by the SFI. Or, the priority of the uplink resource for transmitting HARQ-ACK feedback is equal to the priority of resource dynamically scheduled by DCI which can be rewrote by the SFI.

A method for transmitting a HARQ-ACK feedback of the DL SPS, comprising the following operations: acquiring, by a UE, a slot format indication (SFI) in a DCI and dynamically adjusting slot(s) and/or symbol(s) for uplink or downlink or flexible slots and/or symbols according to the SFI; deciding whether the resource used for a transmission of HARQ-ACK feedback information of at least one-time PDSCH transmission scheduled by the DL SPS is rewrote as the resource for a downlink transmission or flexible resource, and if the resource is rewrote as the resource for the downlink transmission or as flexible resource, postponing the transmission of HARQ-ACK feedback information to the next available resource location for an uplink transmission; or canceling the transmission of HARQ-ACK feedback information.

Preferably, if the resource used for transmission of HARQ-ACK feedback information of at least one-time PDSCH transmission scheduled by the DL SPS is rewrote as the resource for downlink transmission or as flexible resource, the UE doesn't decode the PDSCH corresponding to the HARQ-ACK. That is, the base station cancels the PDSCH transmission corresponding to the HARQ-ACK.

Preferably, the HARQ-ACK feedback information of at least one PDSCH transmission scheduled by the DL SPS is transmitted with other UCI information on the physical uplink control channel (PUCCH) or PUSCH simultaneously.

Preferably, the above other UCI information includes one or more of the following information: HARQ-ACK feedback information, scheduling request (SR) and channel state information (CSI).

Preferably, deciding whether the resource used for the transmission of HARQ-ACK feedback information of at least one time PDSCH transmission scheduled by the DL SPS is rewrote as the resource for the downlink transmission or flexible resource, and if the resource location is rewrote as the resource for downlink transmission or as flexible resource by the SFI, and the HARQ-ACK feedback information of at least one time PDSCH transmission scheduled by the DL SPS is transmitted on the PUCCH alone, the transmission of the HARQ-ACK feedback information is canceled.

Preferably, deciding whether the resource used for at least one-time PDSCH transmission scheduled by the DL SPS is rewrote as the resource for the downlink transmission or as flexible resource by the SFI, and if the resource location is rewrote as the resource for downlink transmission or flexible resource by the SFI, the transmission of the HARQ-ACK feedback information of at least one time PDSCH transmission scheduled by the DL SPS is canceled.

Preferably, deciding whether the resource used for at least one time PDSCH transmission scheduled by the DL SPS is rewrote as the resource for the downlink transmission or as flexible resource by the SFI, and if the resource location is rewrote as the resource for downlink transmission or the resource configured flexibly by the SFI and if the HARQ-ACK feedback information of at least one time PDSCH transmission scheduled by the DL SPS is transmitted on the PUCCH alone, the transmission of the HARQ-ACK feedback information is canceled; or if the HARQ-ACK feedback information of the at least one PDSCH transmission scheduled by the DL SPS is transmitted with other UCI information on the PUCCH and PUSCH simultaneously, the feedback information corresponding to the HARQ-ACK is set as NACK, or the feedback information corresponding to HARQ-ACK is not transmitted.

Figure 12:
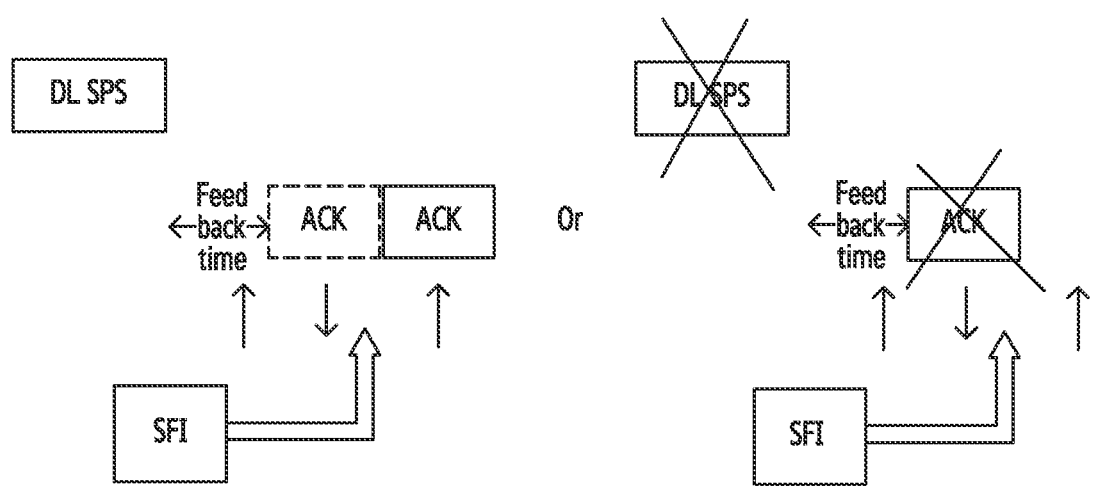
FIG. 12 is a schematic diagram of a HACK-ACK feedback of downlink SPS according to various embodiments of the disclosure.

FIG. 12 is a schematic diagram of a HACK-ACK feedback of downlink SPS according to various embodiments of the disclosure.

Please refer to FIG. 12, when the uplink resource for transmitting the HARQ-ACK of the DL SPS is rewrote as the flexible resource or the downlink resource, the transmission of HARQ-ACK can be postponed to on next uplink resource. Wherein, the next uplink resource can be one or more uplink subframe/slot/symbol(s), which can transmit the HARQ-ACK information completely. When there is repetition of the HARQ-ACK, it may be delayed to the next uplink resource until all the repetition is removed. The above operations are performed on each PDSCH resource scheduled by the SPS.

Alternatively, when the uplink resource for transmitting the HARQ-ACK of the DL SPS is rewrote as flexible resource or downlink resource, the transmission of HARQ-ACK is cancelled, that is, it is not transmitted. When there is repetition of the HARQ-ACK, the transmission of HARQ-ACK is cancelled as long as one uplink resource cannot transmit the HARQ-ACK. As shown in FIG. 12, in this time, since the base station knows that the UE will not provide the HARQ-ACK feedback, it may be pre-defined that the base station does not transmit the PDSCH on the DL SPS resource. In this case, the UE does not need to decode the PDSCH of the downlink SPS. The base station can continue the transmission, and the UE can also continue to decode the SPS PDSCH, but do not perform the feedback. In the above example, the HARQ-ACK of the DL SPS can be transmitted on the uplink or flexible resource indicated by the SFI, and only cannot be transmitted on the downlink resource.

The HARQ-ACK of the DL SPS can transmitted on the same UCI with the HARQ-ACK(s) of other PDSCH(s), wherein the other PDSCH(s) can on the same downlink carrier or different downlink carrier (carrier aggregation) with the DL SPS. When only the HARQ-ACK of the PDSCH of the DL SPS is transmitted on the PUCCH and the PDSCH transmission of the DL SPS is canceled due to being rewrote by the SFI, the HARQ-ACK corresponding to the PDSCH of the DL SPS may not be transmitted, which can save PUCCH resource, or the transmitted HARQ-ACK information bit is NACK.

Figure 13:
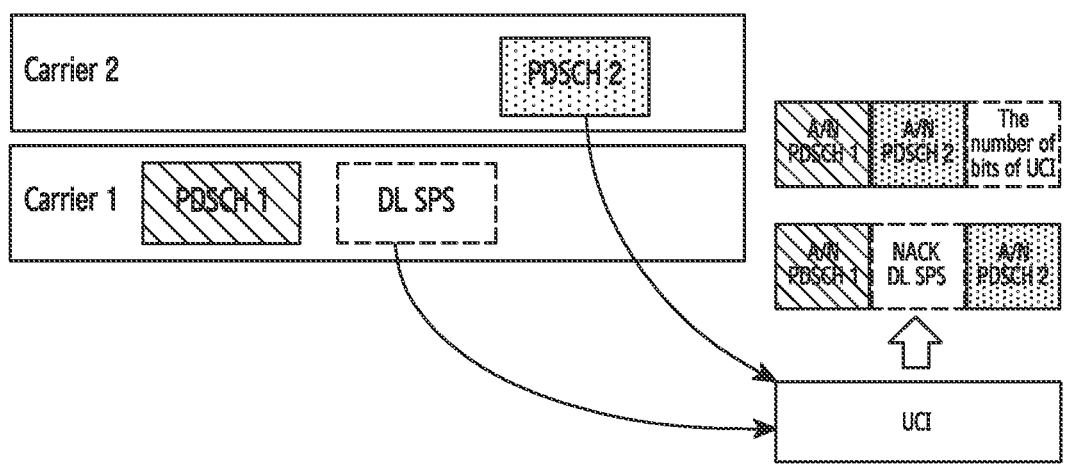
FIG. 13 is a schematic diagram of another HACK-ACK feedback of downlink SPS according to various embodiments of the disclosure.

FIG. 13 is a schematic diagram of another HACK-ACK feedback of downlink SPS according to various embodiments of the disclosure.

Please refer to FIG. 13, PDSCH 1 is the scheduling-based PDSCH transmitted on the carrier 1; PDSCH 2 is the downlink transmission (it can be scheduling-based PDSCH or PDSCH of SPS). According to the HARQ-ACK time configuration, the HARQ-ACKs of the three PDSCHs are transmitted on the same UCI. When this transmission of DL SPS on carrier 1 is canceled due to being rewrote by the SFI, the information bit of the UCI for transmitting the DL SPS can be NACK. Or the feedback is not provided, that is, the number information bits of UCI is reduced. Since the base station and UE have the same understanding, there is no problem with decoding. Particularly, when the scheduling request (SR) and the HARQ-ACK feedback for the DL SPS are at the same time (or partly overlapped in time), the HARQ-ACK feedback is transmitted on the resources of the SR according to the scheduling-based rules. If the transmission of the PDSCH of the SPS is canceled, a sequence of SR is transmitted at the resource of the SR at this time. Or a sequence of NACK may be transmitted on the resource of SR.

Figure 14:
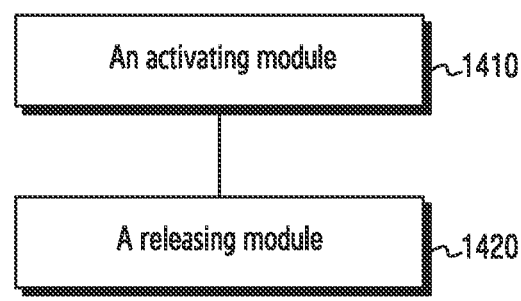
FIG. 14 is a module block of a user equipment for SPS according to various embodiments of the disclosure.

FIG. 14 is a module block of a user equipment for SPS according to various embodiments of the disclosure.

Please refer to FIG. 14, and the user equipment for SPS in the embodiment specifically comprises: an activating module 1410, configured to monitor DCI of a first format group and activate SPS according to an indication in the DCI in the first format group, and a releasing module 1420, configured to monitor DCI in a second format group, and release SPS according to an indication in the DCI in the second format group, wherein, the payload size of the DCI format in the second format group is less than the payload size of the DCI format in the first format group. The operation process of the activating module 1410 and the releasing module 1420 is respectively corresponding to operations 301 and 303 of method for SPS in this embodiment, and will not be repeated herein.

It is described in the above description of SPS activation process that SPS with a longer period can be achieved by configuring super-frame, system-frame, system-subframe and other methods of combining multiple dimensions, when resource assigned by SPS possess a longer period, the SPS method can be applied to paging service or discontinuous reception (DRX) (broadly, paging service belongs to one type of DRX service). A SPS method applied to paging service will be introduced in the following. The method can be also applied to uplink.

Figure 15:
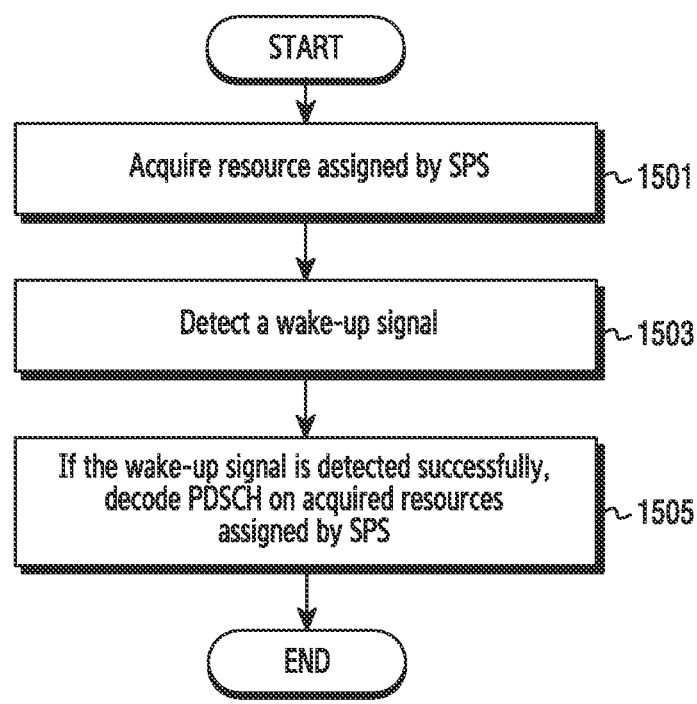
FIG. 15 is a flowchart diagram of another method for SPS according to various embodiments of the disclosure.

FIG. 15 is a flowchart diagram of another method for SPS according to various embodiments of the disclosure.

Referring to FIG. 15, in operation 1501, a UE acquires resource assigned by SPS. UE accomplishes SPS activation and acquires PDSCH or PUSCH time-frequency resource with periodic distributions assigned by base station. Specifically, UE acquires PDSCH or PUSCH time-frequency resource assigned by base station by means of high-layer signaling configuration (RRC or system information specified by UE). If UE is required to record SPS period even in the idle state, the base station configures the SPS period configuration information to UE by means of high-layer signaling (for example, network attached storage (NAS) signaling), when UE needs to calculate SPS period, the SPS period configuration information can be obtained by the high-layer of UE.

In operation 1503, the UE detects a wake-up signal. UE monitors the wake-up signal transmitted by base station, when UE has monitored wake-up signal, UE knows that base station may require transmitting paging information to itself. UE decides whether itself is called by detecting whether this wake-up signal has its identifier (UE identifier), identifier of UE paging group where UE is (UE group identifier) or identifier of system message change. UE identifier, UE group identifier or identifier of system message change is denoted as paging identifier below.

UE obtains time-frequency resource location of wake-up signal by means of base station configuration information (e.g., system information) or high-layer signaling (e.g., NAS signaling). For example, the base station can configure starting position of wake-up signal by RRC message (e.g., system information), such as one or multiple of the following information: system-frame (SFN), system-superframe (HFN) and subframe number. Similarly, the base station configures the frequency-domain resource location of wake-up signal, such as one or multiple of the following information: sequence number of physical resource block (PRB) and non-anchor carrier frequency point. The size of time-frequency resource occupied by base station configuring wake-up signal, such as the number of PRB time-domain or frequency-domain, repetition number of wake-up signal and so on. The time-frequency resource can be pre-defined in standard, for example, when the NB-IoT system is standalone deployment, adopting one or multiple of first three OFDM symbols of the specific subframe; for another example, wake-up signal is on one or k (k can be pre-defined in specification or configured by the base station through RRC signaling or layer 1 signaling) of valid subframe(s) or absolute subframe(s) or k slot(s) or symbol(s) preceding the paging subframe (PO). Besides, the wake-up signal can be transmitted on PDCCH according to appointed rule, or on the other channel resource except of PDCCH and PDSCH.

UE obtains the transmission form of wake-up signal by means of base station configuration information (e.g., system information) or high-layer signaling. The wake-up signal can be any one of the following forms: a type of sequence, a type of signal waveform, a type of DCI format, a type of specified field of DCI format (e.g., repetition number field), a type of scramble for scrambling PDCCH. For instance, the form of wake-up signal is: a sequence which is generated by coding (e.g., repetition coding) and modulating 1 bit of information in the extreme condition. For another example, the form of wake-up signal is: a sequence is comprised of a sequence which is generated by means of coding (e.g., repetition coding) and modulating 1 bit of information and a pilot sequence for decoding. UE can use multiple types of receiving terminal algorithm to decide whether there is its own paging information, such as sequence detection (e.g., correlation detection, energy detection), or decoding judgement, even or CRC check. For another example, the form of wake-up signal is a signal waveform of RNTI sequence, or a signal waveform generated by means of coding and modulation according to RNTI, or a signal waveform is comprised of a signal waveform generated by means of coding and modulation according to RNTI and a pilot signal for decoding, and so on.

In operation 1505, if the wake-up signal is detected successfully, the UE decodes Physical Downlink Shared Channel (PDSCH) or transmitting Physical Uplink Shared Channel (PUSCH) on the acquired resources assigned by SPS.

After UE decides that itself is called, UE further decodes information and data related to paging service (or other DRX services, when this method is applied to DRX service, e.g., uplink service) on PDSCH or PUSCH time-frequency resource with SPS periodic distribution assigned by base station. If the wake-up signal indicating the system information change (that is wake-up signal contains identifier of system message change), then UE further decodes directly system information on the PDSCH or PUSCH time-frequency resource assigned by the base station. For another example, if the wake-up signal indicates the system information change, UE further decodes paging service information on the PDSCH or PUSCH time-frequency resource assigned by the base station, and further obtains the indication of specific system information change. In this way, UE can obtain the changed system information directly, without decoding the unchanged system information, so as to in more favor of saving power consumption.

The information for decoding PDSCH or transmitting PUSCH can be obtained from one or multiple of the following methods: RRC, pre-defined rule, information indication of the wake-up signal. The information required for decoding PDSCH or transmitting PUSCH comprises one or a multiple of the following information: time-frequency resource location (e.g., initial subframe, occupied transmission time), frequency-domain resource location, repetition number, coding and modulation scheme, transmission block size (TBS), HARQ sequence number, and so on. For example, the base station configures a TBS for decoding PDSCH or transmitting PUSCH directly. For another example, the base station can configure the number of UE in each time for answering paging, or the number of UEs for paging can also be fixed in the standard in advance, for example, one UE. UE can obtain, by calculating the number of the UEs for paging, the TBS of PDSCH bearing paging information. The number of UEs can also be indicated by wake-up signal in each time.

Figure 16:
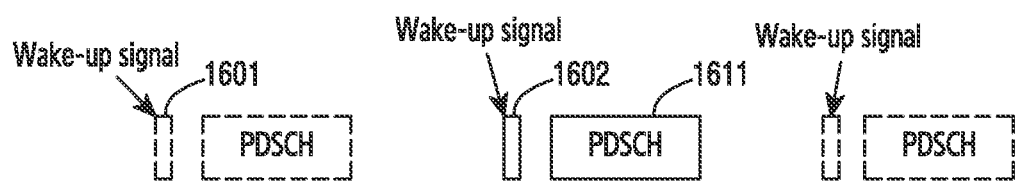
FIG. 16 is a schematic diagram of a paging service application of SPS according to various embodiments of the disclosure.

FIG. 16 is a schematic diagram of a paging service application of SPS according to various embodiments of the disclosure.

Please refer to FIG. 16, and UE monitors a wake-up signal, if UE fails to detect the paging identifier in the wake-up signal on the current time-frequency resource 1601, UE continues to maintain the idle state until the next time-frequency resource 1602 of wake-up signal required to be monitored; if UE detects the paging identifier in the wake-up signal on the time-frequency resource 1602 successfully, then the UE continues to decode the PDSCH or transmit PUSCH on the time-frequency resource (for example, on time-frequency resource 1611 and subsequent other resources with periodic distribution assigned by SPS) assigned by subsequent SPS. Wherein, the wake-up signal monitored by UE can have a very small payload, for example, the SPS wake-up signal is a DCI format, while the number of bits of this DCI is very small. Or in extreme condition, the wake-up signal is in a RNTI format, such as RNTI with 8 bits or RNTI with 16 bits or RNTI with 24 bits.

The embodiment of SPS being applied to DRX is similar to the SPS being applied to paging service, and it will not be repeated here. Comparing the method of paging or DRX in LTE adopting a general DCI, it is unnecessary to extra add the wake-up channel preceding the PDCCH in the method of this embodiment, so as to ignore the decoding of PDCCH. Moreover, the wake-up signal can be designed as a wake-up signal with very small payload, thus the decoding time of UE can be reduced effectively and the power consumption of UE can be reduced, resulting in a more power-saving UE. The similar method can be applied to channel of MBMS, or SC-PTM.

Besides, in order to give consideration to flexibility and low power consumption, whether UE is required to monitor extra PDCCH furtherly can be configured (e.g., by RRC) by a method of base station configuration, or can be indicated (e.g., by the physical layer channel or signal), or indicated by wake-up signal. If it is determined that UE is required to monitor extra PDCCH furtherly, then UE reads an extra PDCCH in the following time slots and rewrites dynamically time-frequency position information of the PDSCH or PUSCH resource assigned by original SPS according to information of scheduling PDSCH or PUSCH on extra PDCCH.

Figure 17:
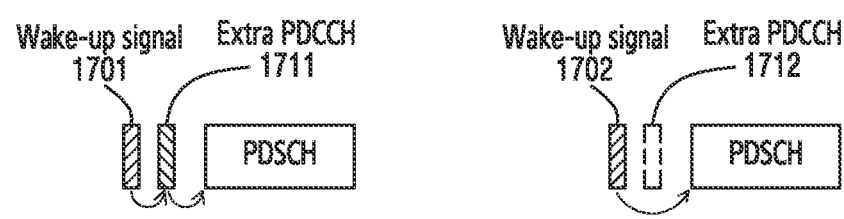
FIG. 17 is a schematic diagram of another paging service application of SPS according to various embodiments of the disclosure.

FIG. 17 is a schematic diagram of another paging service application of SPS according to various embodiments of the disclosure.

Please refer to FIG. 17, and UE monitors the wake-up signal 1701, and if it is indicated that UE is required to rewrite the SPS scheduling information (that is the time-frequency position of resource assigned by SPS) of PDSCH or PUSCH in the wake-up signal 1701, then UE continue to monitor extra PDCCH 1711, and obtains the time-frequency resource 1722 according to information of scheduling PDSCH or PUSCH in PDCCH 1711, and then decodes PDSCH or transmits PUSCH. If UE fails to detect the wake-up signal on time-frequency resource 1701, then UE continues to maintain idle state until the next time-frequency position 1702 of wake-up signal required to be monitored. If UE detects wake-up signal 1702, and the wake-up signal 1702 indicates that it is unnecessary to rewrite the information of scheduling PDSCH or PUSCH, then UE decodes PDSCH or transmitting PUSCH 1722 according to the time-frequency position of resource assigned by original SPS without monitoring the extra PDCCH 1712.

In another example, whether the information of scheduling PDSCH or PUSCH is required be rewrote dynamically, is configured to UE from base station by means of RRC information (e.g., SIB). If it is informed that UE is required to rewrite dynamically the information of scheduling PDSCH or PUSCH from base station by means of RRC information, then UE can directly detect PDCCH without monitoring wake-up signal. This method can be regarded as a fall back mechanism. The fall back mechanism expands the flexibility when SPS method applies to paging service in this embodiment.

For the SPS applied to paging (idle state), DRX (connected state) or broadcast multicast, the activating process can be achieved by RRC configuration and pre-definition, not DCI activating. For example, it can be pre-defined that as long as base station configuring SPS paging, or DRX or MBMS/SC-PTM, UE actives SPS by default when UE receives the above information.

Figure 18:
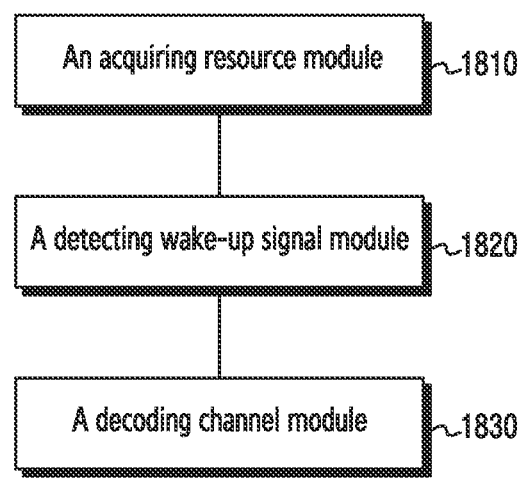
FIG. 18 is a module block diagram of another user equipment for SPS according to various embodiments of the disclosure.

FIG. 18 is a module block diagram of another user equipment for SPS according to various embodiments of the disclosure.

Please refer to FIG. 18, and another user equipment for semi-persistent scheduling of this embodiment comprises, an acquiring resource module 1810 configured to acquiring resource assigned by SPS, a detecting wake-up signal module 1820 configured to detecting a wake-up signal, and a decoding channel module 1830 configured to decode PDSCH or transmit PUSCH, if the wake-up signal is detected successfully, on acquired resource assigned by SPS. The work process of the detecting wake-up signal module 1810, the detecting wake-up signal module 1820 and the decoding channel module 1830 respectively corresponding to operations 1501, 1503, and 1505, and will not be repeat here.

The method of power control will be introduced in the following, specifically, a configuration method of uplink maximum transmit power and a method of power ramping. For the wireless communication system, in order to avoid that UE transmit power is too high to interfere base stations of other cells receiving for the uplink signal, the maximum transmit power transmitted by UE will be limited.

Figure 19:
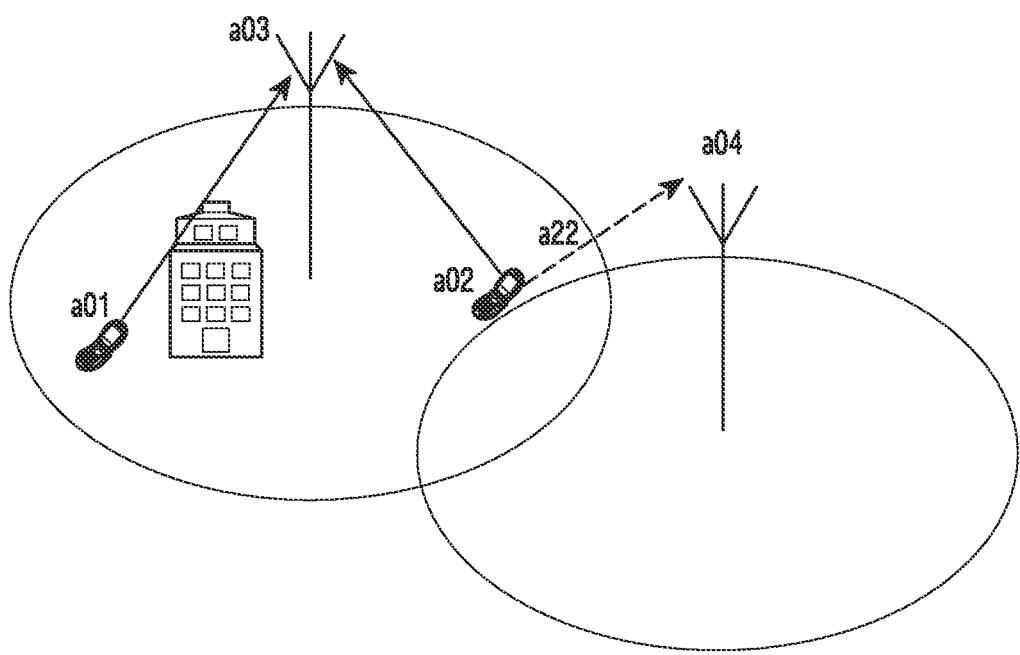
FIG. 19 is a schematic diagram of an uplink power-controlled communication system according to various embodiments of the disclosure.

FIG. 19 is a schematic diagram of an uplink power-controlled communication system according to various embodiments of the disclosure.

Please refer to FIG. 19, and UE a01 resides the cell where the base station a03 is, and its maximum transmit power is limited for avoiding the interference to the base station a04 of adjacent cell. For example, at this moment, UE a02 transmits uplink channel with a limited power, while, the signal intensity received by the base station a04 is a22, which has no influence on the base station servicing UE. The base station will broadcast a maximum uplink transmit power P-max that can be transmitted by the UE of this cell. When UE transmits the random access signal (e.g., narrowband physical random access channel (NPRACH), PRACH), or uplink shared channel (e.g., PUSCH, NPUSCH), or uplink control channel (PUCCH), the maximum transmit power which can be transmitted by UE is less than P-max broadcasted by system. While, in the system of NB-IoT or eMTC, some of UEs is located indoor or in the basement, at this moment, even of UE can transmit a signal with the maximum transmit power, from a point of base station, its signal intensity is still weak. For example, UE a01 will not cause a strong interference to resident cell or other cells, even if using a maximum transmit power $P_{PowerClass}$. For this type of UE, just like other UEs, it is unreasonable to still limit its maximum transmit power. If this type of UE can do their best to transmit their maximum transmit power $P_{PowerClass}$ as possible, on contrary, it is useful to the power consumption of UE.

Preferably, the base station can configure 3 group NPRACH resources at most, and each group resource corresponding to one repetition number of NPRACH, which is defined respectively as enhanced coverage levels 0, 1 and 2. For the NPRACH resource group with minimum repetition number, i.e., enhanced coverage level 0, UE will configure its transmit power according to Reference Signal Received Power (RSRP) measurement result, and will perform power ramping. While, for other enhanced coverage levels, UE will select the maximum transmit power to transmit NPRACH. Alternatively, UE can also perform power ramping in other enhanced coverage levels. Herein, the maximum transmit power is a minimum value between the maximum power (P-max) broadcasted by system and the capability of maximum transmit power of the UE's PA (Power Amplifier) ($P_{PowerClass}$) as below.

$$P_{CMAX\_H,c} = \text{MIN}\{P_{EMAX,c}, P_{PowerClass}\} \qquad \text{Equation 1}$$

Wherein, $P_{EMAX,c}$ is determined by parameters P-max configured by base station.

In order to let UE belongs to a low coverage level (e.g., enhanced coverage level 1 and 2) can transmit a maximum power to the capability of UE's PA ($P_{PowerClass}$), the power ramping can be introduced furtherly in the enhanced coverage level 1 or enhanced coverage level 2.

Figure 20:
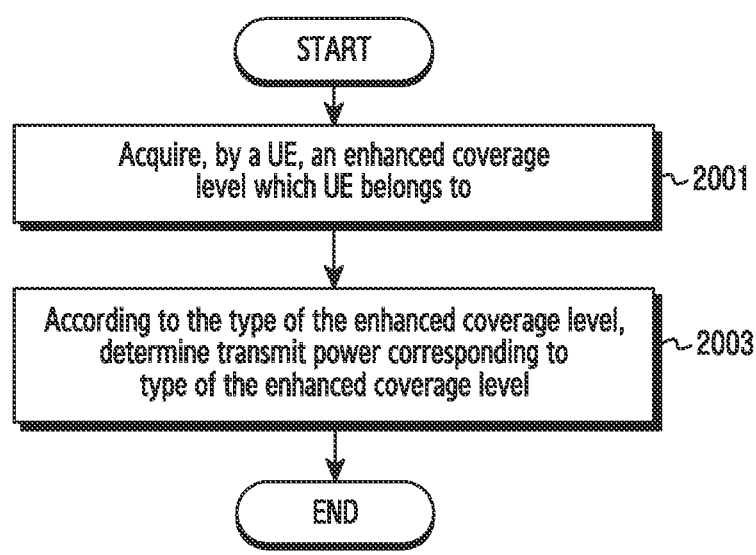
FIG. 20 is a flowchart diagram of a method for stetting maximum power according to various embodiments of the disclosure.

FIG. 20 is a flowchart diagram of a method for stetting maximum power according to various embodiments of the disclosure. Please refer to FIG. 20, and the method for power control in this embodiment comprises the following operations.

Referring to FIG. 20, in operation 2001, a UE acquires an enhanced coverage level which the UE belongs to. In operation 2003, according to type of the enhanced coverage level, the UE determines a transmit power corresponding to the type of the enhanced coverage level.

In an example, if UE belongs to the first enhanced coverage level, then its maximum transmit power is configured as the first power value; if UE belongs to the second enhanced coverage level, then its maximum transmit power can be configured as a second power value.

Wherein, at least one of the first power value or the second power value is configured by base station, or the second power value can be the maximum power value of capability of UE itself. In one example, optionally, the base station can configure a maximum transmit power for each enhanced coverage level. In another example, the maximum transmit power can be decided according to the NPDCCH maximum repetition number (Rmax), for example, if the Rmax configured by base station is more than a threshold, the maximum transmit power is configured as the second power value. Similarly, because of the uplink channel and downlink channel may not have reciprocity, then when using the second power value can be defined by repetition number of uplink channel, such as the repetition number of NPUSCH format 1 or format 2. Specifically, the NPRACH repetition number of the second enhanced coverage level is more than the NPRACH repetition number of the first enhanced coverage level.

In one example, if UE belongs to the first enhanced coverage level, then according to RSRP, UE sets the initial transmit power in the first enhanced coverage level, transmits the NPRACH signal with this initial transmit power. If the random-access request is failed, then UE performs power ramping, until the power up to the maximum power configured by base station or achieve the maximum transmission number. If UE belongs to the second enhanced coverage level, the initial preamble sequence transmit power of the second enhanced coverage level is configured as the maximum transmit power of the previous enhanced coverage level, or the nominal transmit power used for transmitting NPRACH in the first enhanced coverage level, or a transmit power calculated according to target received power of the second enhanced coverage level. UE transmits the NPRACH signal with this initial transmit power, and if the random-access request has failed, UE performs power ramping, until the power up to a second power value of the second enhanced coverage level. For example, the maximum transmit power limited by its PA. Wherein, UE belonging to the second enhanced coverage level comprises the following two cases: UE, according to RSRP, decides that UE belongs to the second enhanced coverage; or UE further ramps up to the second enhanced coverage level due to the maximum attempt number of the first enhanced coverage level is reached. In one example, for the UE ramping from low enhanced coverage level to high enhanced coverage level, or for the UE, according to the RSRP threshold, deciding that NPRACH resource in the second enhanced coverage level is used to transmit NPRACH, they select different methods to set the initial transmit power of the second enhanced coverage level.

Further, the initial transmit power and the information about whether the power ramping is required in the second enhanced coverage level can be obtained by base station configuration.

Figure 21:
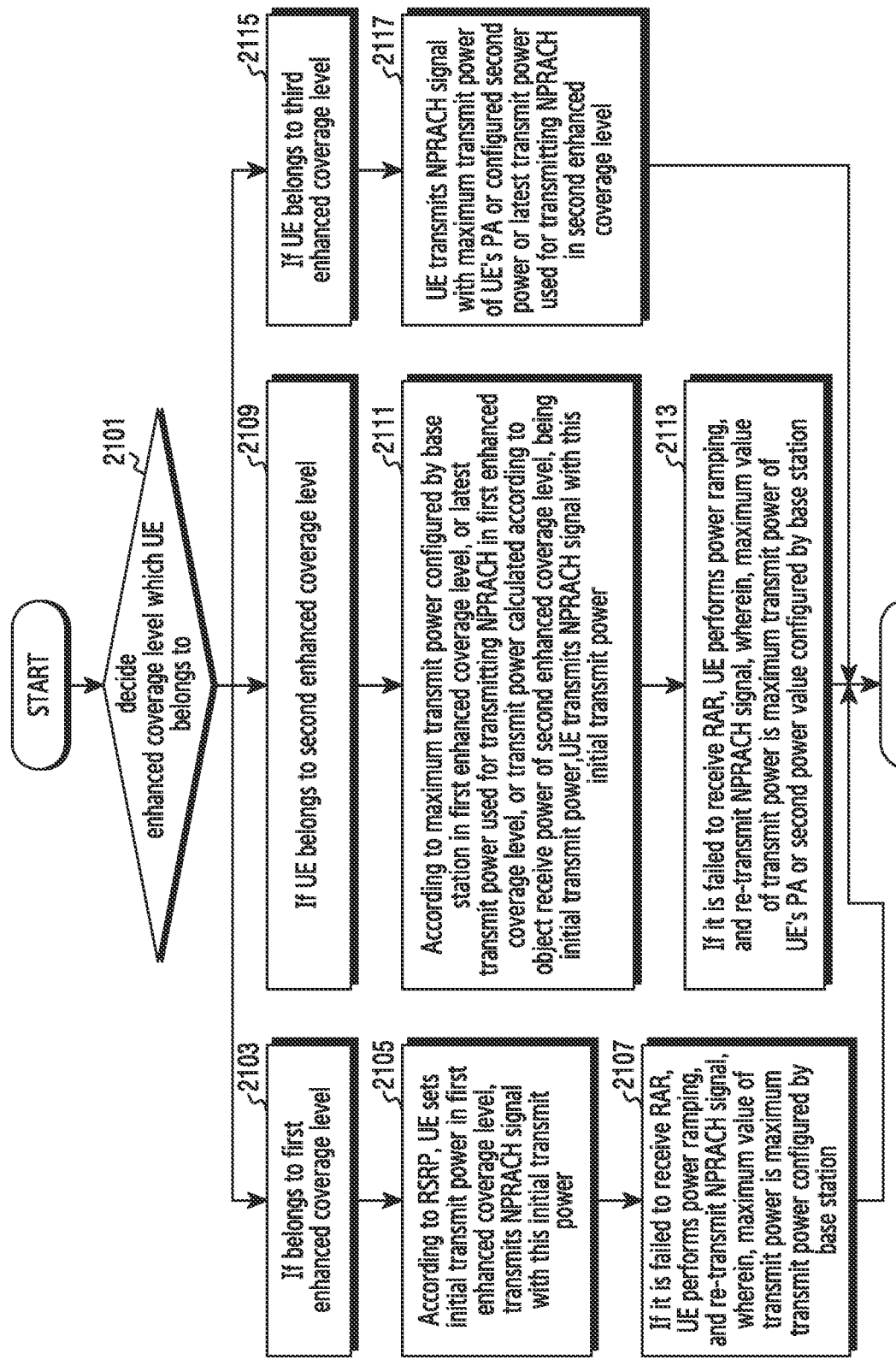
FIG. 21 is a schematic diagram of a method for setting the transmit power of random access signal according to various embodiments of the disclosure.

FIG. 21 is a schematic diagram of a method for setting the transmit power of random access signal according to various embodiments of the disclosure.

Please refer to FIG. 21, which is a schematic diagram of configuration method of transmit power of the random-access signal. Referring to FIG. 21, in operation 2101, a UE decides the enhanced coverage level which UE belongs to. If UE belongs to the first enhanced coverage level in operation 2103, according to RSRP, UE sets the initial transmit power in the first enhanced coverage level, transmits the NPRACH signal with this initial transmit power in operation 2105. In operation 2107, If UE fails to receive the Random-Access Response (RAR), then UE performs the power ramping, re-transmits the NPRACH signal, wherein, the maximum value of transmit power is the maximum transmit power configured by the base station. If the maximum attempt number is reached in the first enhanced coverage level, UE continues to use the NPRACH resource in the second enhanced coverage level to transmit NPRACH. If UE belongs to the second enhanced coverage level in operation 2109, according to the maximum transmit power configured by base station in the first enhanced coverage level or the nominal transmit power used for transmitting NPRACH in the first enhanced coverage level, or a transmit power calculated according to target received power of the second enhanced coverage level, being the initial transmit power, UE transmits NPRACH signal with the initial transmit power in operation 2111. In operation 2113, if UE fails to receive RAR, UE performs power ramping, and re-transmits the NPRACH signal again, wherein, the maximum value of transmit power is the maximum transmit power of the UE's PA or the second power value configured by base station. If UE belongs to the third enhanced coverage level in operation 2115, UE transmits NPRACH signal with the maximum transmit power of UE's PA or the second power value in operation 2117. For the UE belonging to the enhanced coverage level 0, UE performs power ramping, and the maximum transmit power of UE is the minimum value between the maximum power (P-max) broadcasted by system and the capability of maximum transmit power of the UE's PA ($P_{PowerClass}$), i.e.: $P_{CMAX,CE0} = \text{MIN}\{P_{EMAX}, P_{PowerClass}\}$. For the UE belonging to the enhanced coverage level 1, UE continues to perform power ramping, and its initial value is configured as the minimum value between the maximum power (P-max) broadcasted by system and the capability of maximum transmit power of the UE's PA ($P_{PowerClass}$), i.e., $P_{CMAX,CE0}$; when the UE belongs to the enhanced coverage level 1, its maximum transmit power is the maximum transmit power $P_{PowerClass}$ of the UE's PA (denoted as $P_{CMAX,CE1}$). In other words, UE can first decide whether system broadcasts a maximum power $P_{EMAX}$ and whether the maximum power $P_{EMAX}$ broadcasted is less than the maximum transmit power ($P_{PowerClass}$) of the UE's PA. If $P_{EMAX} < P_{PowerClass}$, and UE belongs to the enhanced coverage level 1, UE continues to perform the power ramping until the power from $P_{EMAX}$ up to $P_{PowerClass}$. Except using enhanced coverage level 1 due to RSRP, UE ramp up to the enhanced coverage level 1 because of the UE in enhancement coverage level 0 reached the maximum attempt number. In this case, the initial power in the enhanced coverage level 1, can be configured as the transmit power used for the last transmission of NPRACH in the first enhanced coverage level (enhanced coverage level 0). If there is enhanced coverage level 2, the enhanced coverage level the maximum transmit power of UE's PA ($P_{PowerClass}$, i.e. $P_{CMAX,CE2}$) to transmit the preamble sequence.

Figure 22:
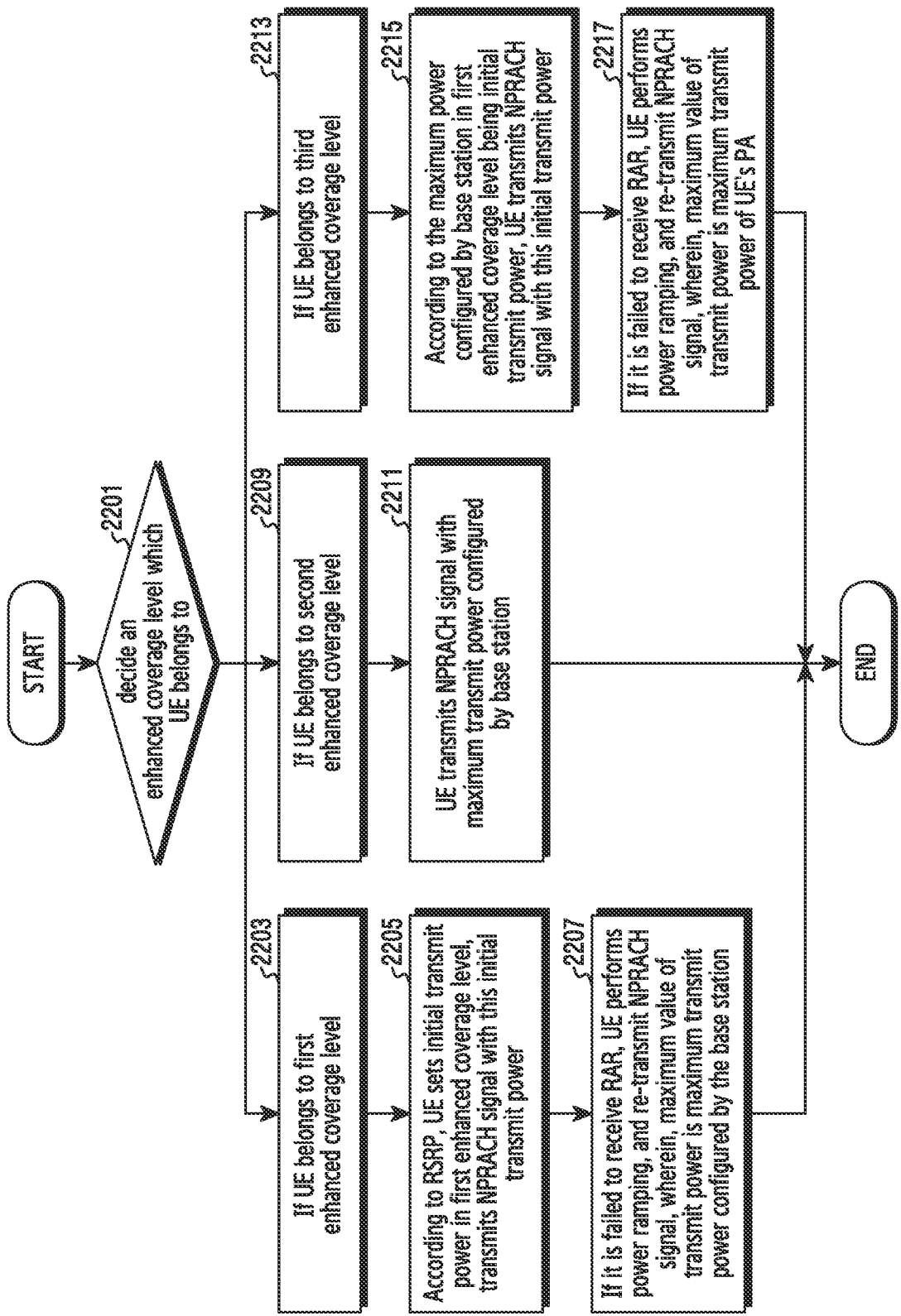
FIG. 22 is a schematic diagram of another method for setting the transmit power of random access signal according to various embodiments of the disclosure.

FIG. 22 is a schematic diagram of another method for setting the transmit power of random access signal according to various embodiments of the disclosure.

Please refer to FIG. 22, which is a schematic diagram of another configuration method of transmit power of the random-access signal. In operation 2201, UE decides the enhanced coverage level which UE belongs to. If UE belongs to the first enhanced coverage level in operation 2203, then according to RSRP, UE sets the initial transmit power in the first enhanced coverage level, transmits the NPRACH signal with this initial transmit power in operation 2205. In operation 2207, if UE fails to receive the random-access response RAR, then UE performs the power ramping, re-transmits the NPRACH signal, wherein, the maximum value of transmit power is the maximum transmit power configured by the base station. If UE belongs to the second enhanced coverage level in operation 2209, then UE transmits the NPRACH signal with the maximum transmit power configured by the base station in operation 2211. If UE belongs to the third enhanced coverage level in operation 2213, according to the maximum transmit power configured by base station in the first enhanced coverage level being the initial transmit power, UE transmits the NPRACH signal with the initial transmit power in operation 2215. In operation 2217, if UE fails to receive random access response, UE performs power ramping, and re-transmits the NPRACH signal, wherein, the maximum value of transmit power is the maximum transmit power of UE's PA.

In another example, for the UE belonging to the enhanced coverage level 0, UE uses power ramping, and its maximum transmit power of UE is the minimum value between the maximum power (P-max) broadcasted by system and the capability of maximum transmit power of the UE's PA ($P_{PowerClass}$), i.e., $P_{CMAX,CE0}$=MIN{$P_{EMAX},P_{PowerClass}$}. For UE belonging to the enhanced coverage level 1, UE does not support the power ramping, and continues to use $P_{CMAX,CE1}$=$P_{CMAX,CE0}$ to transmit the preamble sequence. For the UE belonging to the enhanced coverage level 2, UE starting from $P_{CMAX,CE0}$, ramps to the maximum transmit power ($P_{PowerClass}$, i.e. $P_{CMAX,CE2}$) of UE's PA to transmit the preamble sequence.

For the NPUSCH transmitting Msg3 in the $i^{th}$ time slot, its transmit power is decided according to the maximum transmit power $P_{CMAX, CE_k}$ of the corresponding the enhanced coverage level k. More specifically, if the repetition number of Msg3 more than a threshold (for example 2), the transmit power is decided using the maximum transmit power corresponding to its enhanced coverage level, i.e., $P_{NPUSCH}(i)$= $P_{CMAX, CE_k}$ [dBm], or else, the transmit power is decided according to the occupied bandwidth, and transmit power $P_{O\_PRE}$ used when transmitting the NPRACH preamble sequence, and a power deviation $\Delta_{PREAMBLE\_Msg3}$ configured by high-layer, and the maximum transmit power $P_{CMAX, CE_k}$ corresponding to the enhanced coverage level k. In an example, $P_{NPUSCH}(i)$=min{$P_{CMAX, CE_k}$, 10 log ($M_{NPUSCH}(i)$+$P_{O\_PRE}$+$\Delta_{PREAMBLE\_Msg3}$+PL)} [dB m], wherein, $M_{NPUSCH}(i)$ is an impact factor of signal occupied bandwidth, PL is a downlink path loss. The above configuration method for maximum transmit power of Msg3 can be applied to retransmission of Msg3, and HARQ-ACK information transmission of Msg4, and more, the calculation of Msg3 or power head room (PHR) carried by other uplink NPUSCH, wherein, the fiducial value of power head room is the maximum transmit power value of the transmitted NPUSCH, that is, the PHR in the Msg3 corresponding to the maximum transmit power value of Msg3.

For the transmission of other NPUSCH, its maximum uplink power is decided according to the maximum transmit power $P_{CMAX, CE_k}$ of the corresponding enhanced coverage level k. Besides, its maximum transmit power can be configured by base station, for example, performing rewrite in the RRC signaling which configures the NPUSCH transmission. For example, one P-max parameter specified by user can be introduced and the parameter takes effect after being configured. In one example, this parameter is valid merely to uplink NPUSCH channel of non-Msg3. In another example, once the configuration taking effect, it is applicable until the idle sate. For the NPRACH transmission triggered by NPDCCH, its maximum transmit power can still use the existing configuration, or can be configured again according to the corresponding enhanced coverage level. After the NPRACH is transmitted, the maximum transmit power can be re-configured again according to the coverage level corresponding to NPRACH trigged by NPRACCH, or continue to reuse the maximum transmit power of the original connected state.

Figure 23:
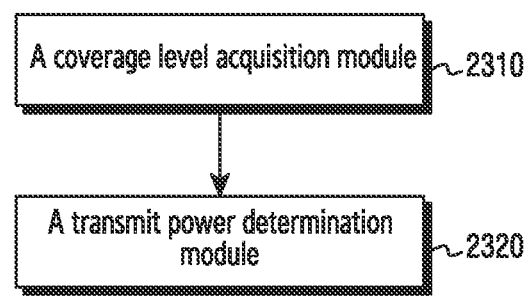
FIG. 23 is a module block diagram of a user equipment for power control according to various embodiments of the disclosure.

FIG. 23 is a module block diagram of a user equipment for power control according to various embodiments of the disclosure.

Please refer to FIG. 23, and the user equipment for SPS in this embodiment comprises. a coverage level acquisition module 2310 configured to acquire an enhanced coverage level which the UE belongs to, and a transmit power determination module 2320 configured to determine, according to type of enhanced coverage level, a maximum transmit power corresponding to this type.

The operation process of the coverage level acquisition module and the transmit power determination module respectively corresponding to the operations 2001 and 2003 of power control method in this embodiment, and will not be repeated here.

In combination with the above detail description of this embodiment, compared with exiting technical, this the embodiment at least has the following beneficial technical effects.

First, the payload size of the scheduled DCI format after SPS is activated in the disclosure is less than the payload size of the scheduled DCI format activated by the SPS, so as to reduce the power consumption of UE monitoring and detecting DCI, reduce schedule overhead of downlink channel of SPS, reduce service delay, and promote efficiency of utilization resource significantly.

Second, it is allowed to directly indicate and assign channel resource for HARQ old data retransmission when the SPS scheduling module is activated, which is applicable to the scene of transmission with a large data volume and retransmission with high frequency when the coverage condition is low in the NB-IoT, to avoid the downlink channel overhead of again scheduling resource and assigning resource to HARQ old data retransmission after SPS is activated, and promote the entire (e.g., whole) performance of the system.

Third, the flexibility and expandability of SPS scheduling is expanded by means of combining or designing DCI format in various ways, that is, fields contained in DCI, to configure parameters of SPS activation and dynamical scheduling.

Fourth, multiple retransmission response methods are provided which satisfy the SPS assignment requirement for HARQ retransmission in different scenes, reduce the overhead of HARQ signaling interactive, and promote the reliability of system.

Fifth, a SPS with longer period is introduced and it can be used for paging channel or DRX channel, resulting in reducing the downlink signal overhead and power consumption of UE.

Sixth, by introducing the second maximum transmit power, in other words, by removing the limitation, which is from the configured first transmit power, on the maximum transmit power in the coverage enhanced channel condition, UE can perform the transmission of uplink channel or signal with a larger transmit power, consequently, resulting in reducing the unnecessary transmission time, reducing the uplink signal overhead and power consumption of UE.

In several embodiments provided by the disclosure, it should be understood that, the disclosed systems, devices and methods can be realized by other modes. For example, the device embodiment described above is merely illustrative. For example, the classification of the units is merely a logical function classification. Other classification modes can be provided while in the actual implementations. For example, a multiple of units or components can be combined or can be integrated to another system, or some features can be ignored, or cannot be executed. On the other point, the displayed or discussed coupling, directly coupling or communication connection between each other can be indirect coupling or communication connection of devices or units through some interfaces, which can be electrical, mechanical or other modes.

The unit as a separator for illustration can be separated physically or cannot be separated physically, the unit as a display component can be a physical unit or cannot be a physical unit, in other word, the display unit can locate in one place, or the physical unit can be distributed to a multiple of network units. Part of units or all the units can be selected according to the actual requirement to realize the purpose of the embodiment.

Moreover, each of functional units in each embodiment of the disclosure can be integrated into one process unit, or can exist in isolation as each unit physically, or can be integrated into one unit by at least two units. The above integrated unit can be realized using hardware, or can be realized using software functional unit.

Those skilled in the art can understand that part of the operations or the whole operations of the method of the embodiments can be completed by the indication of the related hardware according to the program. The program can be stored in a computer readable storage medium. The storage medium can comprise: read only memory (ROM), random access memory (RAM), disc, compact disc (CD) or other storage mediums.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a narrow band internet of things (NB-IoT) user equipment (UE), the method comprising:
    receiving, from a base station, a radio resource control (RRC) message including configuration information associated with a plurality of enhanced coverage levels, wherein the configuration information associated with the plurality of enhanced coverage levels includes:
        information on an initial power of a random access preamble for a first enhanced coverage level,
        information associated with a power ramping for the first enhanced coverage level,
        information on an initial power of a random access preamble for a second enhanced coverage level, and
        information associated with a power ramping for the second enhanced coverage level;
    identifying the UE belongs to the first enhanced coverage level based on a reference signal received power (RSRP);
    identifying a first transmit power, determined by the information on the initial power of the random access preamble for the first enhanced coverage level;
    performing a first random access preamble transmission based on the first transmit power;
    performing retransmissions using the information associated with the power ramping for the first enhanced coverage level, used for the first enhanced coverage level of the UE in case that a random access response corresponding to the first random access preamble transmission is not received;
    in case that the first random access preamble transmission is not successful by the retransmission, continue performing, by the UE, preamble transmission attempts based on the information associated with the power ramping for the first enhanced coverage level in case that a maximum number of preamble transmission attempt is not reached in the first enhanced coverage level; and
    in case that the maximum number of preamble transmission attempt is reached in the first enhanced coverage level,
        selecting a resource corresponding to a second enhanced coverage, used for a second random access preamble transmission,
        identifying a second transmit power, determined by the initial power of the random access preamble for the second enhanced coverage level,
        performing the second random access preamble transmission based on the second transmit power, and
        performing retransmissions using the information associated with the power ramping for the second enhanced coverage level, used for the second enhanced coverage level of the UE in case that a random access response corresponding to the second random access preamble transmission is not received,
    wherein the first enhanced coverage level is different from the second enhanced coverage level.

2. The method of claim 1,
    wherein the first enhance coverage level is an enhanced coverage level 0, and
    wherein the second enhanced coverage level is an enhanced coverage level 1.

3. The method of claim 1, wherein the first transmit power is determined based on a repetition number for the random access preamble.

4. A method performed by a base station (BS), the method comprising:
    transmitting, to a narrow band internet of things (NB-IoT) user equipment (UE), a radio resource control (RRC) message including configuration information associated with a plurality of enhanced coverage levels, wherein the configuration information associated with the plurality of enhanced coverage levels includes:
        information on an initial power of a random access preamble for a first enhanced coverage level,
        information associated with a power ramping for the first enhanced coverage level,
        information on an initial power of a random access preamble for a second enhanced coverage level, and
        information associated with a power ramping for the second enhanced coverage level;
    receiving, from the UE, a first random access preamble transmitted based on a first transmit power, used for the first enhanced coverage level identified by the UE based on the configuration information;
    transmitting a random access response corresponding to the first random access preamble; and
    in response to transmitting the random access response, receiving, from the UE, a second random access preamble on a resource corresponding to a second enhanced coverage, used for a second random access preamble transmission, transmitted based on a second transmit power, in case that the random access response corresponding to the first random access preamble is not received by the UE and a maximum number of preamble transmission attempt is reached in the first enhanced coverage level, the second transmit power is used for the second enhanced coverage level identified by the UE based on the configuration information,
    wherein the first enhanced coverage level is different from the second enhanced coverage level.

5. The method of claim 4,
    wherein the first enhance coverage level is an enhanced coverage level 0, and
    wherein the second enhanced coverage level is an enhanced coverage level 1.

6. The method of claim 4, wherein the first transmit power is determined based on a repetition number for the random access preamble.

7. A narrow band internet of things (NB-IoT) user equipment (UE), the UE comprising:
a transceiver; and
at least one processor coupled to the transceiver,
wherein the at least one processor is configured to:
receive, from a base station, a radio resource control (RRC) message including configuration information associated with a plurality of enhanced coverage levels, wherein the configuration information associated with the plurality of enhanced coverage levels includes:
information on an initial power of a random access preamble for a first enhanced coverage level,
information associated with a power ramping for the first enhanced coverage level,
information on an initial power of a random access preamble for a second enhanced coverage level, and
information associated with a power ramping for the second enhanced coverage level,
identify the UE belongs to the first enhanced coverage level based on a reference signal received power (RSRP),
identify a first transmit power, determined by the information on the initial power of the random access preamble for the first enhanced coverage level,
perform a first random access preamble transmission based on the first transmit power,
perform retransmissions using the information associated with the power ramping for the first enhanced coverage level, used for the first enhanced coverage level of the UE in case that a random access response corresponding to the first random access preamble transmission is not received,
in case that the first random access preamble transmission is not successful by the retransmission, continue to perform preamble transmission attempts based on the information associated with the power ramping for the first enhanced coverage level in case that a maximum number of preamble transmission attempt is not reached in the first enhanced coverage level, and
in case that the maximum number of preamble transmission attempt is reached in the first enhanced coverage level,
select resource corresponding to a second enhanced coverage, used for a second random access preamble transmission,
identify a second transmit power, determined by the initial power of the random access preamble for the second enhanced coverage level,
perform the second random access preamble transmission based on the second transmit power, and
perform retransmissions using the information associated with the power ramping for the second enhanced coverage level, used for the second enhanced coverage level of the UE in case that a random access response corresponding to the second random access preamble transmission is not received,
wherein the first enhanced coverage level is different from the second enhanced coverage level.

8. The UE of claim 7,
wherein the first enhance coverage level is an enhanced coverage level 0, and
wherein the second enhanced coverage level is an enhanced coverage level 1.

9. The UE of claim 7, wherein the first transmit power is determined based on a repetition number for the random access preamble.

10. A base station (BS), the BS comprising:
a transceiver; and
at least one processor coupled to the transceiver,
wherein the at least one processor is configured to:
transmit, to a narrow band internet of things (NB-IoT) user equipment (UE), a radio resource control (RRC) message including configuration information associated with a plurality of enhanced coverage levels, wherein the configuration information associated with the plurality of enhanced coverage levels includes:
information on an initial power of a random access preamble for a first enhanced coverage level,
information associated with a power ramping for the first enhanced coverage level,
information on an initial power of a random access preamble for a second enhanced coverage level, and
information associated with a power ramping for the second enhanced coverage level,
receive, from the UE, a first random access preamble transmitted based on a first transmit power, used for the first enhanced coverage level identified by the UE based on the configuration information, and
transmit a random access response corresponding to the first random access preamble, and
in response to the transmission of the random access response, receive, from the UE, a second random access preamble on a resource corresponding to a second enhanced coverage, used for a second random access preamble transmission, transmitted based on a second transmit power, in case that the random access response corresponding to the first random access preamble is not received by the UE and a maximum number of preamble transmission attempt is reached in the first enhanced coverage level, the second transmit power is used for the second enhanced coverage level identified by the UE based on the configuration information,
wherein the first enhanced coverage level is different from the second enhanced coverage level.

11. The BS of claim 10,
wherein the first enhance coverage level is an enhanced coverage level 0, and
wherein the second enhanced coverage level is an enhanced coverage level 1.

12. The BS of claim 10, wherein the first transmit power is determined based on a repetition number for the random access preamble.

* * * * *